United States Patent [19]
Cowan et al.

[11] Patent Number: 6,149,718
[45] Date of Patent: Nov. 21, 2000

[54] CONTAMINATION CONTROL SYSTEM

[75] Inventors: Cathy L. Cowan, Canton; Luciano M. Melluzzo, New Britian, both of Conn.

[73] Assignee: Mott Mettallurgical Corporation, Farmington, Conn.

[21] Appl. No.: 09/173,902

[22] Filed: Oct. 16, 1998

[51] Int. Cl.[7] .............................. B01D 53/04; B01D 46/00
[52] U.S. Cl. ................................ 96/147; 55/417; 55/418; 55/504; 96/153
[58] Field of Search ............................. 96/147, 151, 153, 96/108; 55/417, 418, 503, 504, 312, 505, 508, 512

[56] References Cited

U.S. PATENT DOCUMENTS

| | | |
|---|---|---|
| 1,345,571 | 7/1920 | Yates . |
| 1,999,460 | 4/1935 | Johnson ........................................ 183/4 |
| 2,313,773 | 3/1943 | Samiran ...................................... 55/417 |
| 2,707,051 | 4/1955 | Mailhot et al. ............................ 55/417 |
| 2,758,719 | 4/1956 | Line ........................................... 96/147 |
| 2,880,753 | 4/1959 | Wilkins ..................................... 137/549 |
| 2,920,716 | 1/1960 | Shada ........................................ 183/41 |
| 2,931,668 | 4/1960 | Baley ........................................ 284/19 |
| 3,241,537 | 3/1966 | Jones ......................................... 55/417 |
| 3,961,919 | 6/1976 | Lamoreaux ............................... 96/138 |
| 4,278,453 | 7/1981 | Klein ......................................... 96/151 |
| 4,483,461 | 11/1984 | Igarashi ..................................... 222/3 |
| 4,509,554 | 4/1985 | Failla ................................... 137/614.05 |
| 4,689,057 | 8/1987 | Gasper ...................................... 55/275 |
| 4,696,687 | 9/1987 | Billiet et al. .............................. 55/316 |
| 4,971,110 | 11/1990 | Cato .................................... 137/614.02 |
| 5,139,747 | 8/1992 | Cato et al. .............................. 422/122 |
| 5,558,688 | 9/1996 | Cowan et al. ............................ 55/312 |
| 5,902,551 | 5/1999 | Cowan et al. ............................ 96/147 |

Primary Examiner—Duane S. Smith
Attorney, Agent, or Firm—Hale and Dorr LLP

[57] ABSTRACT

Contamination Control System includes a housing having a cartridge input-output port and an application input-output port The cartridge is coupleable to the cartridge input-output port and of a size to completely fit in an interior of the housing. A dual isolation interface is provided between cartridge and housing so that each entity may be separately isolated at the fluid interface. The isolation interface is resiliently engageable to make the fluid path open and close. The cartridge has a body physically defining a multi-region interior chamber, the chamber in fluid communication with an input and an output and defining a fluid flow path therebetween larger than any dimension of the body.

35 Claims, 24 Drawing Sheets

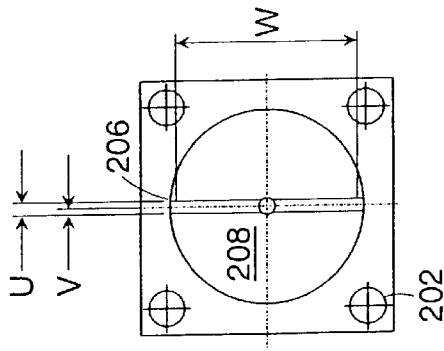
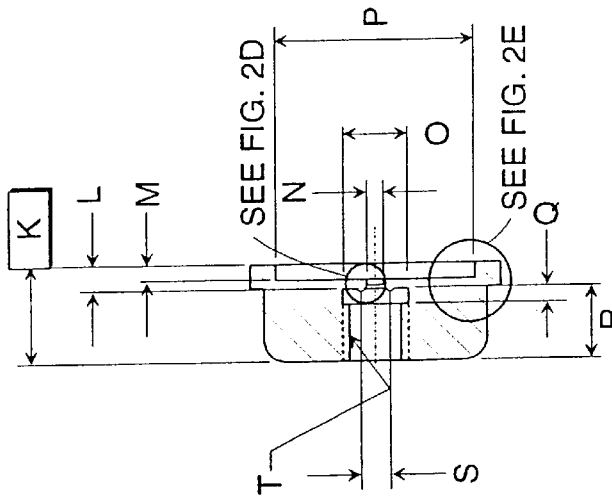
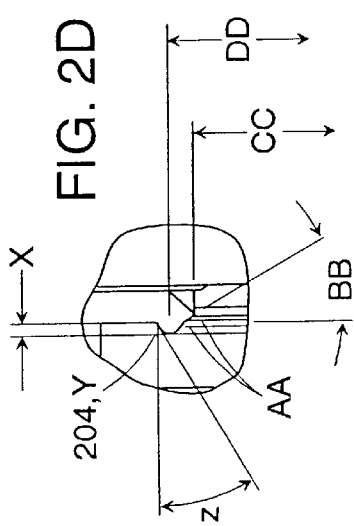
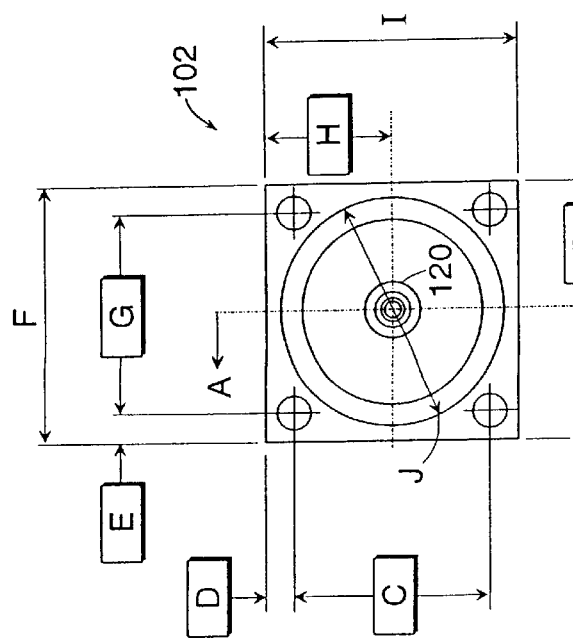

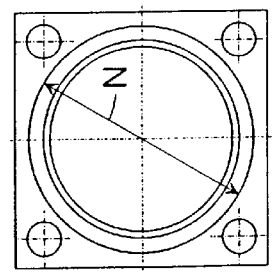
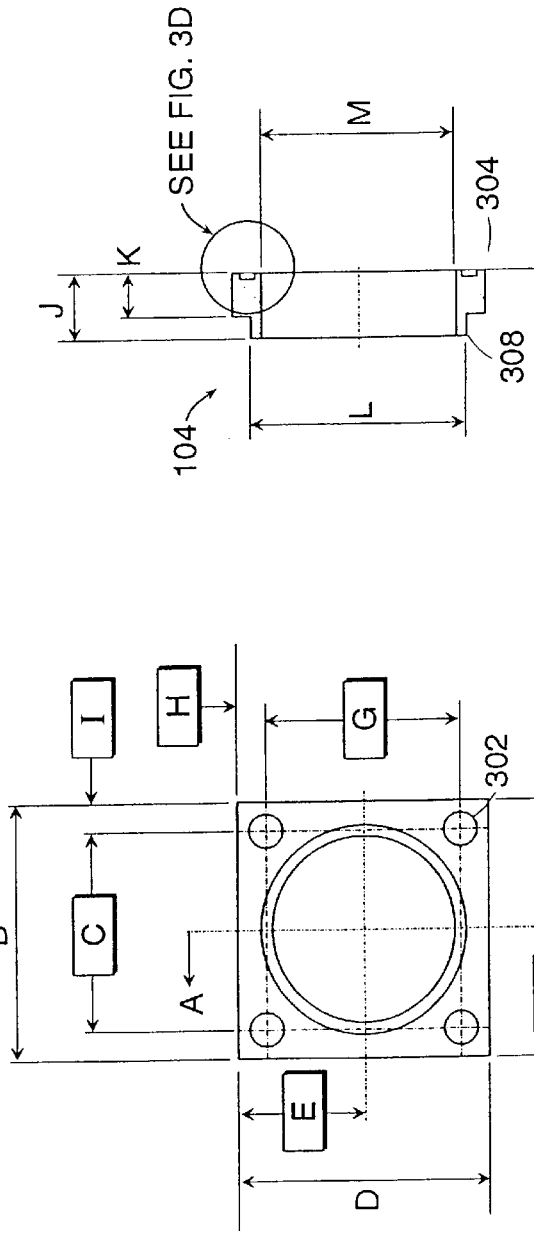
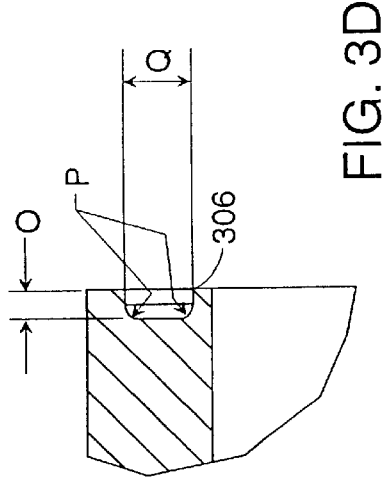
FIG. 3C
FIG. 3D
FIG. 3B
FIG. 3A

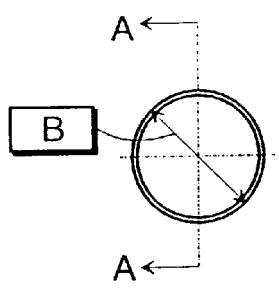
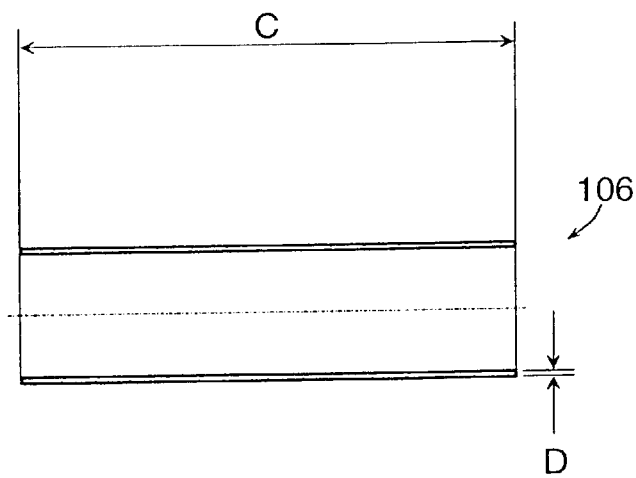
FIG. 4A
FIG. 4B

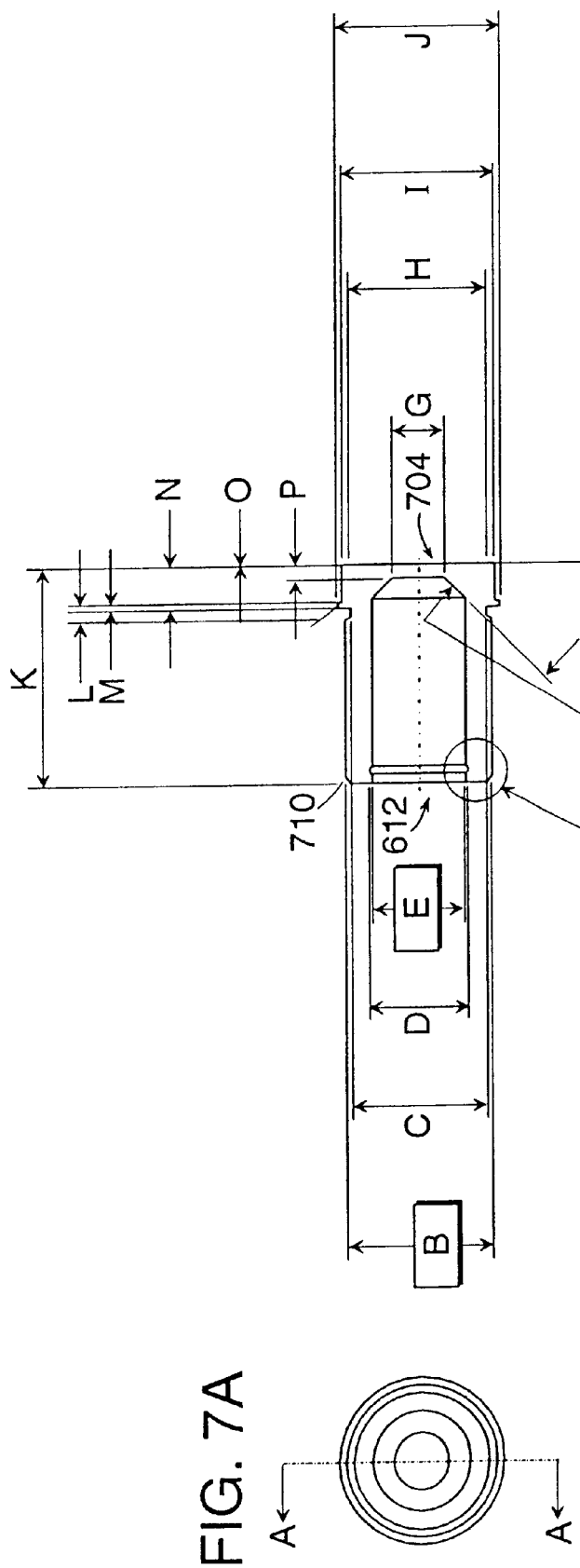
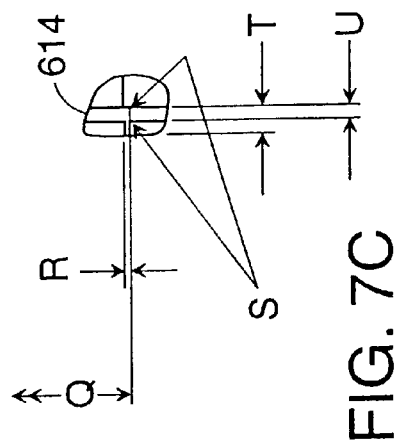
FIG. 7A
FIG. 7B
FIG. 7C

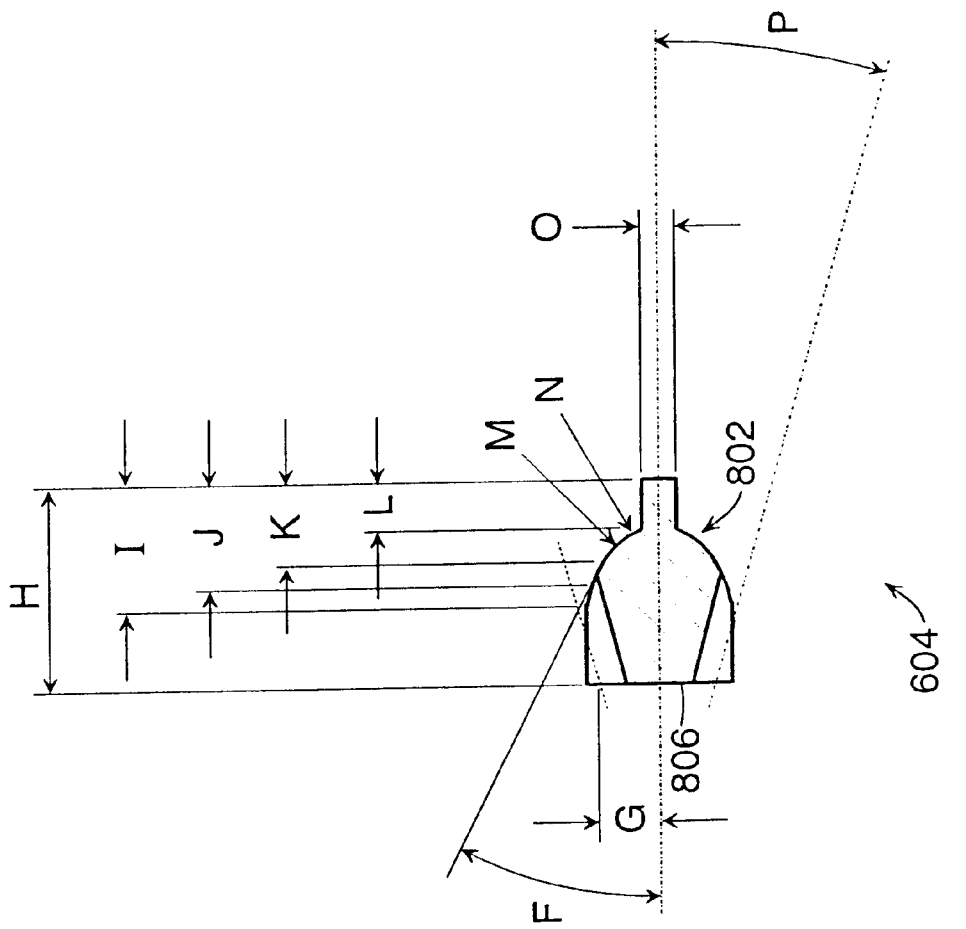
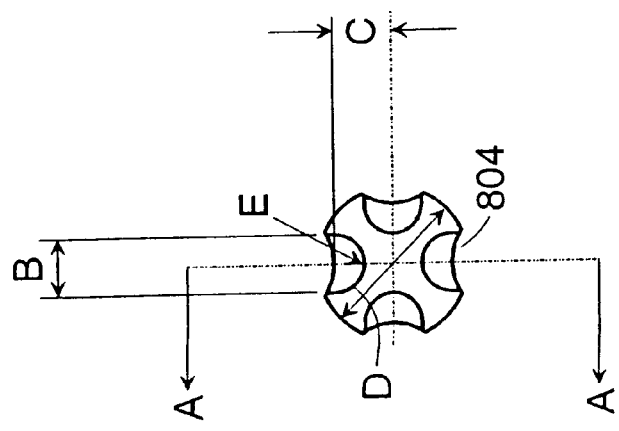

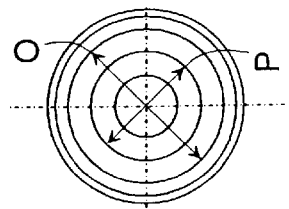
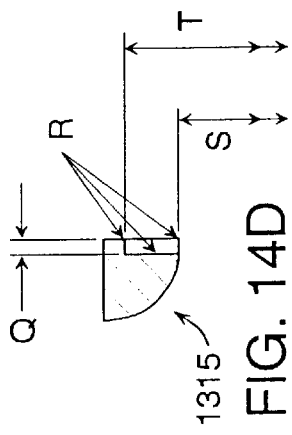
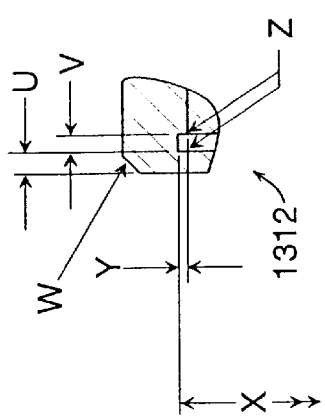
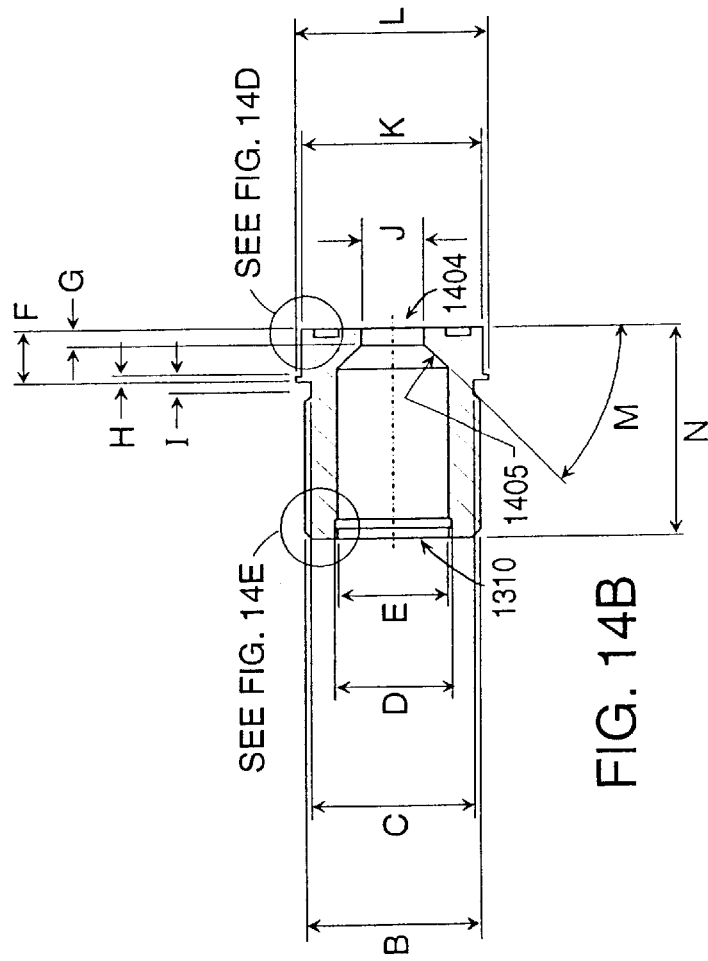
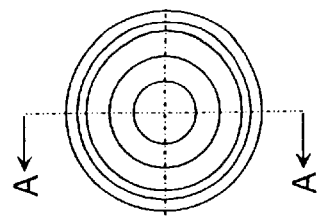

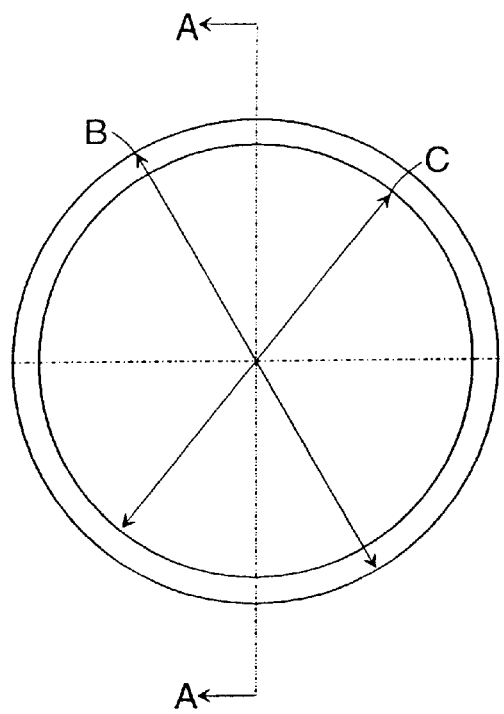 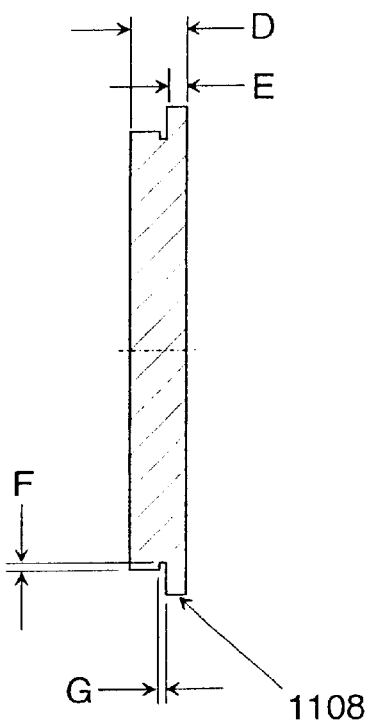
FIG. 15A  FIG. 15B
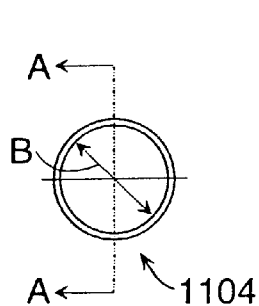 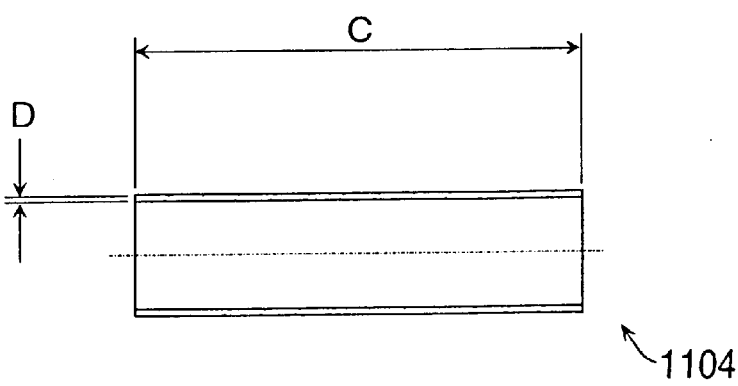
FIG. 16A  FIG. 16B

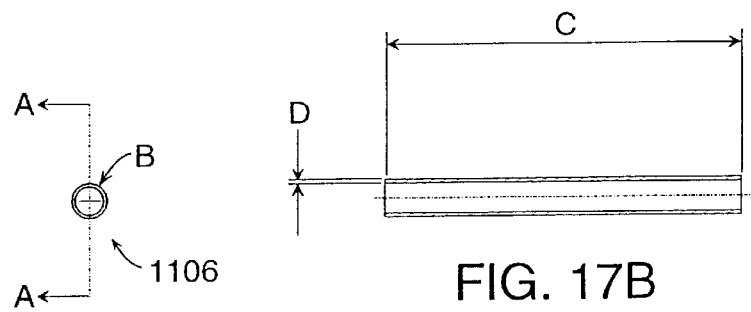
FIG. 17A
FIG. 17B
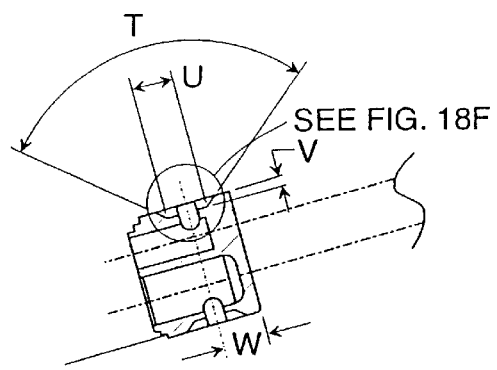
FIG. 18D
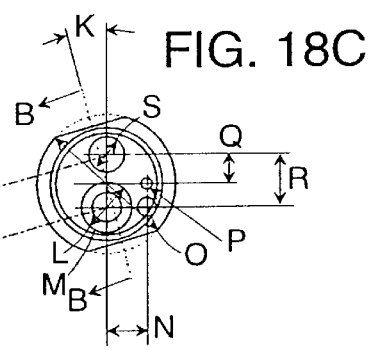
FIG. 18C
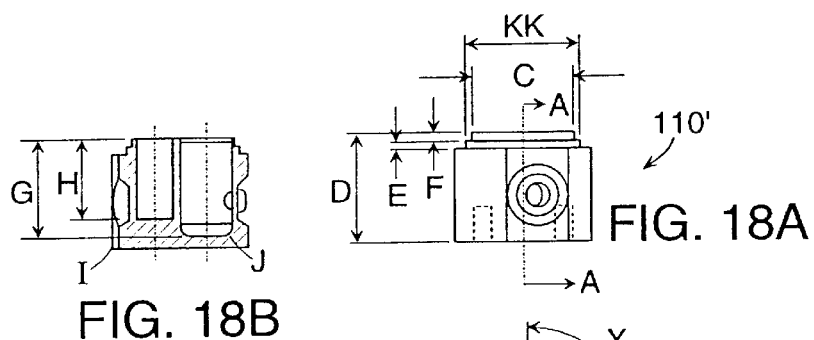
FIG. 18B
FIG. 18A
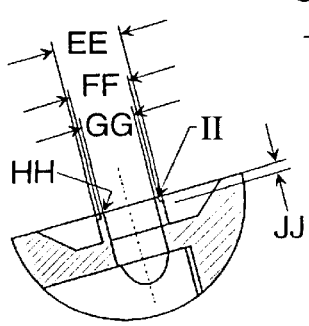
FIG. 18F
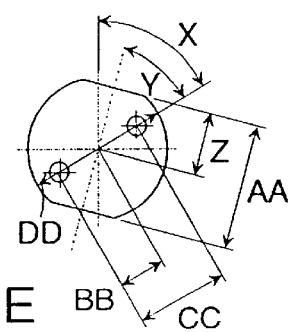
FIG. 18E

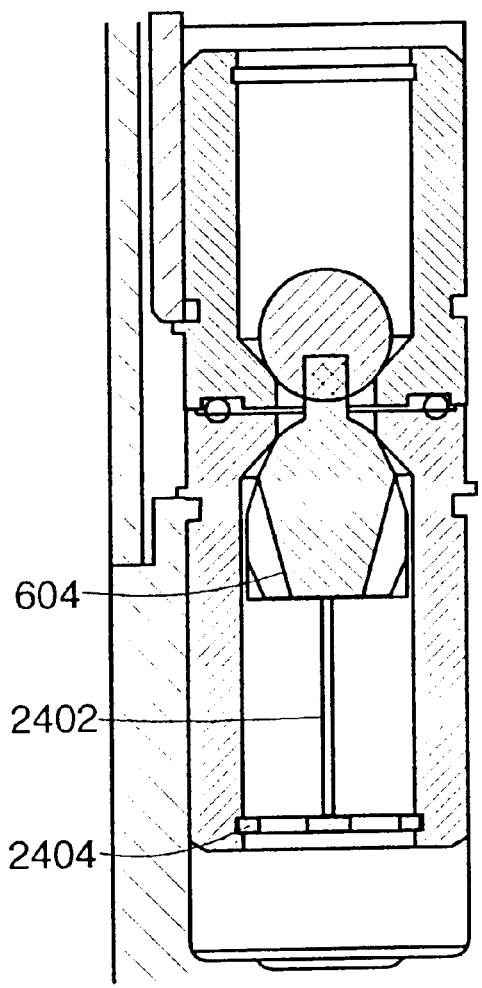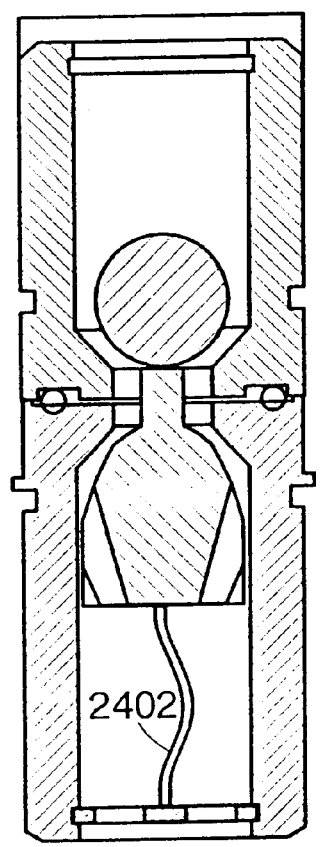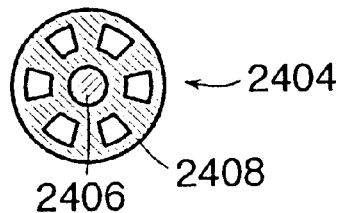
FIG. 24A
FIG. 24B
FIG. 24C

CONTAMINATION CONTROL SYSTEM

BACKGROUND OF THE INVENTION

1. Field of the Invention

This invention relates generally to contamination control and, more specifically, to contamination control of fluids with media contained in a replaceable assembly.

2. Discussion of Related Art

Many industries require some form of contamination control. Examples include the electronics, aerospace, biotechnology, and the food and beverage industries. Each industry defines an acceptable level of contamination through de facto or formal standards, and these standards typically address particle and gas phase impurities in fluids. Some fields, such as electronics, also effectively define acceptable configuration and physical parameters such as the available footprint in which a purification device should fit and the types and size of plumbing fittings. For example, the semiconductor manufacturing industry is increasingly relying on purification devices having footprints no larger than 3.31 inches on a side.

U.S. Pat. No. 5,558,688 to Cowan et al. (the "'688 patent") and U.S. Pat. No. 5,139,747 to Cato et al. (the "'747 patent") disclose purification systems that may be used in semiconductor manufacturing. The '688 patent, among other things, discloses a purification system having a block body and a one-piece removable canister. The block body interfaces the canister with a gas stream. The canister holds a purification media and includes a tube for carrying the gas from an inlet to the top of the purification media. The gas exits the tube and flows down through the media to an outlet tube, the block body, and eventually the rest of the fluid application system. Each tube has a corresponding wire mesh frit at its distal end relative to the canister's block body. A poppet valve assembly, contained in the canister, isolates the canister from atmosphere during the canisters removal or installation. The '747 patent discloses a one-piece inline purification assembly having a baffle stack for holding a purification media and for defining a flow path. The input and output ports include a poppet valve assembly to isolate the device.

Some disadvantages of the above arrangements include performance, system cost, difficulty in removing and replacing media, and ability to perform leak tests. Performance involves the amount of media per unit area and the ability of a fluid to interact with that media efficiently. The length of the flow path is less than the length of the canister, flowing top to bottom. Any media voids affect performance because fluids will take the path of least resistance in flowing through the assembly. Likewise, the geometry of the flow path affects performance. System cost is affected by component cost of the overall system and the replaceable components and by the labor costs of maintaining the assembly. Maintenance costs are affected by the difficulty in removing and replacing media and in handling the devices. The ability to perform leak tests is self explanatory and a consequence of the design.

Concerning performance, the '688 inlet tube is empty and does not contribute to performance. Some canister areas, e.g., the area below the output tube, contain media but in a position less likely to contribute to performance. These areas are believed to be an inefficient use of valuable space. At least some, if not all, embodiments are believed to be difficult to completely pack with media, producing the possibility of media voids. Moreover, the possibility of media voids may also arise from settling of media, for example, during shipping or handling of the canister.

Concerning cost, the '688 system requires a canister change, and the '747 system requires a complete system change, when the media is exhausted. The replaceable components are costly because they are manufactured with expensive techniques. Given tight configurations of modern systems, the replaceable components are difficult to remove and replace, as they require access to the base of the assemblies, thus increasing maintenance costs. Neither the '688 system nor the '747 system provides explicit mechanisms to leak test an installed system.

SUMMARY

A preferred embodiment of the invention provides a containment control system. The system includes a housing having a cartridge input-output port and an application input-output port. It also includes a cartridge of a size to completely fit in an interior of the housing, the cartridge being coupleable to the housing's cartridge input-output port and engageable therewith to define a fluid communication path therebetween when engaged.

According to one aspect of the invention, the housing's cartridge input-output port includes a first input isolation mechanism and first output isolation mechanism. Both the first input isolation mechanism and first output isolation mechanism have a first state defining a respective fluid communication path and a second state closing the respective fluid communication path. The cartridge includes a second input isolation mechanism and second output isolation mechanism. Both the second input isolation mechanism and second output isolation mechanism have a first state defining a respective fluid communication path and a second state closing the respective fluid communication path.

According to another aspect of the invention, the system includes a leak test port to test an interior of the housing.

According to another aspect of the invention, a housing for a containment control system is provided. It includes a body defining a housing interior and having cartridge input-output port and an application input-output port and a repositionable cap for providing access to the housing interior in a first position, and for sealing the cartridge in the housing in a second position.

According to another aspect of the invention, the housing includes a base defining a first input cavity sized to receive a first input isolation mechanism and first output cavity sized to receive a first output isolation mechanism. The first input isolation mechanism and first output isolation mechanism are sized to be insertable into, respectively, the first input cavity and the first output cavity and the first input isolation mechanism is inserted into the first input cavity and welded thereat and the first output isolation mechanism is inserted into the first output cavity and welded thereat.

According to another aspect of the invention, a cartridge for a containment control system is provided. It includes a body that physically defines a multi-region interior chamber. The chamber is in fluid communication with an input and an output and defines a fluid flow path therebetween longer than any dimension of the body.

BRIEF DESCRIPTION OF THE DRAWINGS

In the Drawing,

FIGS. 2A–E show a preferred cap in plan view; cross-section views, bottom view; and enlarged views;

FIGS. 3A–D show a preferred adapter in plan view, cross section view, bottom view; and enlarged view;

FIGS. 4A–B show a preferred containment tube in end view and cross-section view;

FIGS. 7A–C show a preferred body in plan view, cross-section view, and enlarged view;

FIGS. 8A–B show a preferred plunger valve in bottom view and cross-section view;

FIGS. 14A–E show a preferred upper isolation assembly body in plan view, cross-section view, bottom view, and enlarged views;

FIGS. 15A–B show a preferred end cap in plan view and cross-section view;

FIGS. 16A–B show a preferred outer tube in end view and cross-section view;

FIGS. 17A–B show a preferred inner tube in end view and cross-section view;

FIGS. 18A–G show an alternative base in side elevation view, cross-section views, plan view, enlarged view, and in perspective view;

FIGS. 24A–C show an alternative biasing mechanism.

DETAILED DESCRIPTION

Preferred embodiments of a contamination control system (CCS), in their most basic form, include a cartridge-containing housing and a removable cartridge assembly, which may be used to contain a purification or filtration media ("cartridge assembly" or "cartridge"). The actual media used is application-specific and not a feature of this invention. The removable cartridge assembly is architected so that it may be manufactured with less costly techniques than those used in one-piece canisters or one-piece systems.

The preferred removable cartridge arrangements provide the further advantage of double containment of the media and fluids in the cartridge both during use. Double containment is achieved as a consequence of the housing containing the cartridge and the cartridge containing the purification or filtration media.

Preferred arrangements have a fluid isolation interface that isolates the housing from atmosphere when a cartridge is not coupled to the housing and that preferably also isolates an input and output port of the cartridge from atmosphere during installation and removal. The preferred interface defines a fluid communication path for each component and for the combination of components only when the housing and cartridge are properly coupled and engaged. By isolating the cartridge and the housing separately, dual isolation is provided.

Moreover, preferred CCS embodiments include a leak test capability so that the CCS may be tested in situ to determine its fluid containing capability. Testing may be done under pressure or vacuum conditions.

Furthermore, preferred CCS embodiments with particular relevance to fluid purification use a cartridge having a multiple, separately-defined region flow path that is longer than the largest dimension of the cartridge. The increased flow path improves the reaction chemistries of the system. The preferred purification cartridge arrangements are easily filled to avoid media voids and has a design that is believed to better inhibit media settling that might otherwise cause media voids.

I. A Particular Embodiment for Use in Semiconductor Manufacturing

Figure 1B:
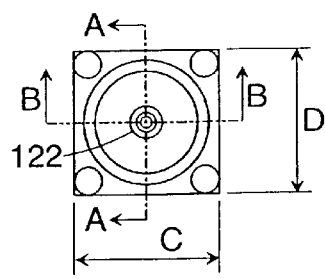
FIGS. 1A–E show a preferred embodiment of the invention in perspective, plan, and cross-section views.
Figure 1D:
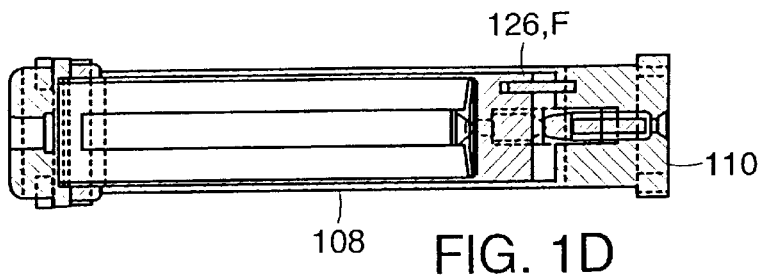
Figure 1C:
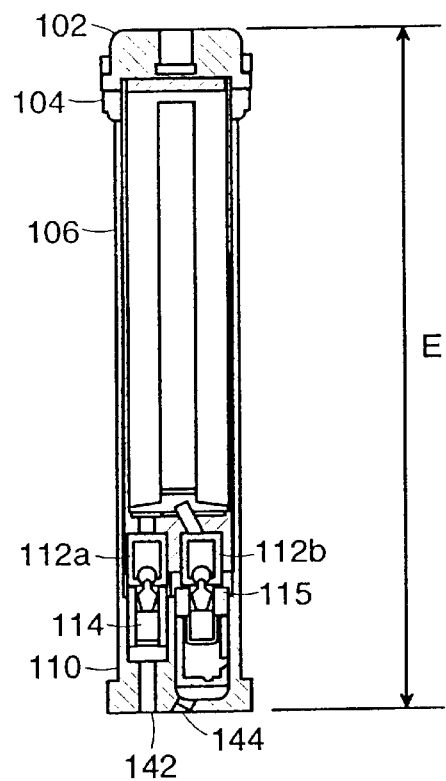
Figure 1A:
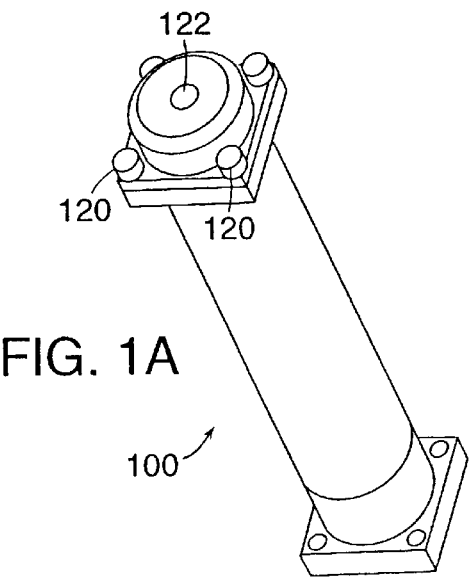
Figure 1E:
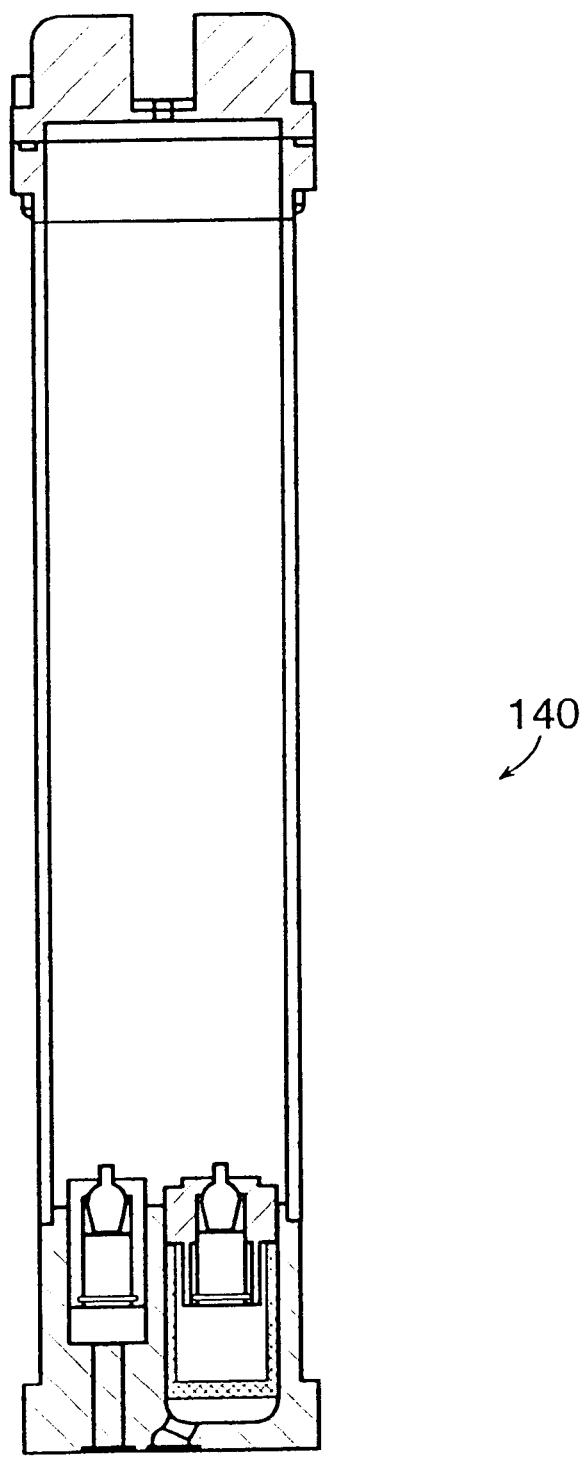

A preferred embodiment of a CCS 100, shown in FIGS. 1A–E, may be used for fluid purification in a "gas-stick" arrangement, e.g., such as those available from Insync Systems, Incorporated, or Unit Instruments, Incorporated. It should be understood that this is but a specific embodiment for a particular fluid application, that is, the gas-stick arrangement, and though this particular application is important, it does not limit the scope of the invention. Thus, bearing in mind that the dimensions and sizes provided in this specification and the drawings are largely driven from the particular application, and not limiting to the invention, FIG. 1A is a perspective view of a preferred CCS; FIG. 1B is a plan view; FIG. 1C is a cross-section view along A—A; FIG. 1D is a cross-section view along B—B; and FIG. 1E shows a preferred housing 140. The table below provides the sizes (measure in inches) of the illustrated dimensions.

| C | 1.476 | D | 1.476 | E | 6.949 | F | pin 0.125 × 0.75 |
|---|---|---|---|---|---|---|---|

The cartridge assembly 108 may be removed from housing 140 and replaced with a new cartridge while the housing 140 is in situ within the application. This removability and replaceability are possible through a combination of the housing's and cartridge's design and of the fluid communication interface provided. More specifically, housing 140 includes a removable cap 102, which when removed allows access to the cartridge 108. The fluid interface, provided by the combination of upper 112*a,b* and lower isolation assemblies 114, 115, defines a fluid communication path between the cartridge and housing when the two entities are properly coupled together and isolates each entity at the interface when they are uncoupled. Thus, dual isolation is provided—once at the cartridge side and once at the housing side. Dual isolation offers the advantage of protecting the media in the cartridge from atmosphere until it is installed, preserving the media's integrity. It also offers the advantage of isolating fluids (including potentially toxic fluids, depending on the application) still in the cartridge from escaping to atmosphere when the cartridge is removed. It also protects the rest of the fluid application from atmosphere when the cartridge is removed.

The cartridge 108 may be coupled to housing 140 by inserting it into the housing cavity in alignment with locating pin 126, thus aligning lower 114, 115 and upper isolation assemblies 112a,b and by securing cap 102 with sufficient force to ensure that the cartridge 108 and lower isolation assemblies properly engage to define a fluid communication path therebetween. More specifically, by securing the cap (e.g., through a torque sequence) an inner surface (208, see FIG. 2C) of cap 102 is caused to contact the top of the cartridge 108 and to eventually cause the isolation assemblies to engage and define a fluid communication path therebetween.

CCS 100 may be leak tested while the components are in situ through leak test port 122 on cap 102. Port 122 defines a ⅛ inch VCR plug (known in the art) which is in fluid communication with the housing interior holding the cartridge 108. Once the cartridge is in place and the cap is secured, a leak test device may be coupled to port 122 to test CCS under vacuum and pressure conditions as desired.

a. Housing

Cartridge-containing housing 140 includes an assembled combination of cap 102, adapter 104, containment tube 106, base 110, and lower isolation assemblies 114, 115. Unless otherwise noted, steel (e.g., 316L) is used to manufacture the above components and sub-components, and all components and sub-components are polished to a 32 Ra microinch finish, for example, via mechanical polishing.

A preferred cap 102 is shown in FIGS. 2A–E. FIG. 2A is a plan view; FIG. 2B is a cross-section view along A—A; FIG. 2C is a bottom view; and FIGS. 2D and 2E are enlarged views of certain details shown in FIGS. 2A–C. The table below provides the sizes (measure in inches) of the illustrated dimensions.

| B | 0.738 | J | 1.312 | R | 0.455 | Z | 30° |
|---|---|---|---|---|---|---|---|
| C | 1.189 | K | 0.6 | S | 0.17 | AA | R0.15 |
| D | 0.144 | L | 0.15 | T | 5/16-24 UNF -2B | BB | 30° |
| E | 0.144 | M | 0.09 | U | 0.063 | CC | 0.094 |
| F | 1.476 | N | 0.094 | V | 0.032 | DD | 0.17 |
| G | 1.189 | O | 0.375 | W | 1.092 | FE | 0.01 |
| H | 0.738 | P | 1.156 | X | 0.015 | | |
| I | 1.476 | Q | 0.1 | Y | R0.015 | | |

Cap 102 is secured to the adapter 104 through screws 120, which are threaded through screw holes 202 into adapter holes, described below. Detail 204 is electropolished to a 10 Ra microinch finish. Sampling crevice 206 facilitates leak testing by covering the diameter of the cartridge 108. Inner surface 208 is sized to receive a top of cartridge 108.

A preferred adapter 104 is shown in FIGS. 3A–D. FIG. 3A shows a plan view; FIG. 3B shows a cross section view along A—A; FIG. 3C shows a bottom view; and FIG. 3D shows a groove detail. The table below provides the sizes (measure in inches) of the illustrated dimensions.

| B | 1.476 | G | 1.189 | L | 1.25 | Q | 0.084 |
|---|---|---|---|---|---|---|---|
| C | 1.189 | H | 0.144 | M | 1.152 | | |
| D | 1.476 | I | 0.144 | N | 1.379 | | |
| E | 0.738 | J | 0.39 | O | 0.04 | | |
| F | 0.738 | K | 0.25 | P | R0.005 | | |

Adapter 104 contacts cap 102 at surface 304. In operation, the two are sealed by an o-ring (not shown but for example an elastomer o-ring) inserted in groove 306 and by tightening one to the other via screws 120 (see FIG. 1A) which pass through holes 202 of cap 102 (see FIG. 2C) and into threaded screw holes 302. The other end of adapter 104 is welded (e.g., tig welded) to containment tube 106 along circular extension 308 to form a butt weld joint.

A preferred containment tube 106 is shown in FIGS. 4A–B. FIG. 4A is an end view, and FIG. 4B is a cross-section view along A—A. The table below provides the sizes (measure in inches) of the illustrated dimensions.

| B | 1.25 | C | 4.86 | D | .049 |
|---|---|---|---|---|---|

Containment tube 106 may be made from any suitable form of standard tubing (e.g., 316L). As stated above, containment tube 106 is butt welded at one end to adapter 104 along its circular extension 308. The other end of tube 106 is welded (e.g., tig) to base 110, as explained below.

Figure 5C:
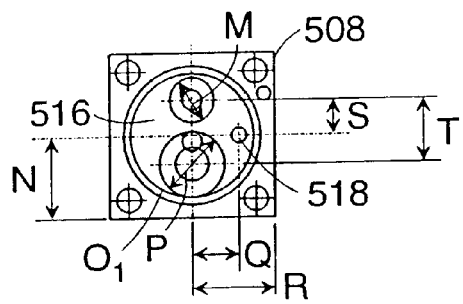
FIGS. 5A–E show a preferred base in elevation view, cross-section view, plan view, bottom view, and enlarged view.
Figure 5A:
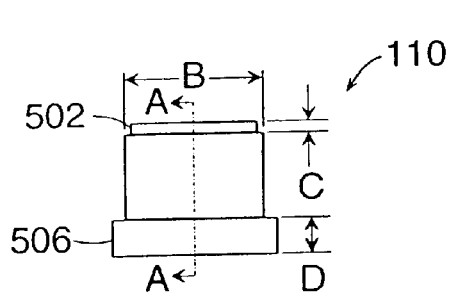
Figure 5B:
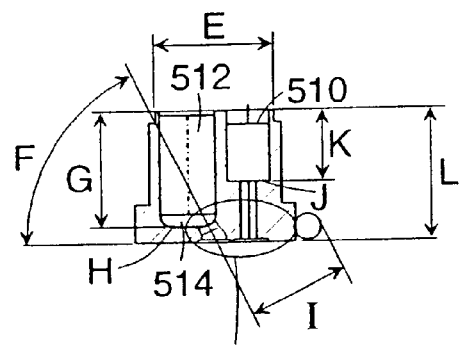
Figure 5D:
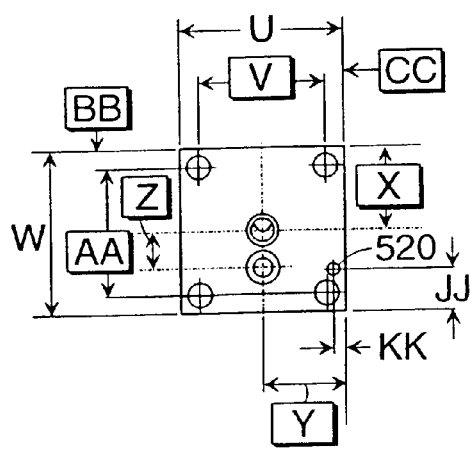
Figure 5E:
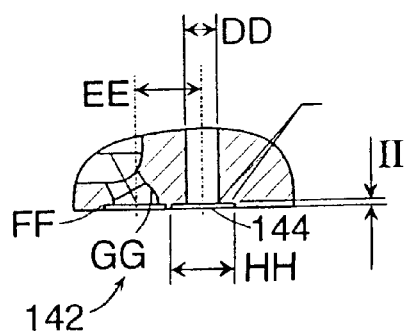

A preferred base 110 is shown in FIGS. 5A–E. FIG. 5A is an elevation view; FIG. 5B is a cross-section view along A—A; FIG. 5C is a plan view; FIG. 5D is a bottom view; and FIG. 5E shows a detail for the fluid interface to the rest of the fluid system. The table below provides the sizes (measure in inches) of the illustrated dimensions.

| B | 1.25 | L | 1.189 | V | 1.189 | FF | R.015 |
|---|---|---|---|---|---|---|---|
| C | 0.09 | M | 0.395 | W | 1.476 | GG | R.100 |
| D | 0.345 | N | 0.738 | X | 0.738 | HH | 0.289 |
| E | 1.125 | O | 0.586 | Y | 0.738 | II | 0.024 |
| F | 63° | P | 0.563 | Z | 0.305 | JJ | 0.372 |
| G | 1.065 | Q | 0.438 | AA | 1.189 | KK | 0.087 |
| H | R.125 | R | 0.738 | BB | 0.144 | | |
| I | 0.94 | S | 0.316 | CC | 0.144 | | |
| J | 0.015 × 45° | T | 0.566 | DD | 0.157 | | |
| K | 0.656 | U | 1.476 | EE | 0.305 | | |

Base 110 defines a shoulder 502 on which containment tube 106 is positioned and welded to base 110. Four screw holes 508 are defined in plate portion 506 to receive screws (not shown) to mount the base 110, and consequently housing 140, to the rest of a fluid application system (possibly with an intermediary adapter block, depending on the application). At a lower surface 514, cavity 510 defines fluid port 144, and cavity 512 defines fluid port 142 to provide fluid communication to the rest of the fluid application. An upper surface 516 defines a hole 518 for locating pin 126 (see FIG. 1D). The base defines a first cavity 510 for holding a lower isolation assembly 114 and a second cavity 512 for holding a another lower isolation assembly 115. Wetted surfaces of details H, K, M, DD, GG are electropolished to 10 Ra microinch. Hole 520 facilitates alignment with the application, e.g., gas-stick arrangement. (Measurement I is with respect to a standard 0.25 inch machinist's roll.)

Figure 6A:
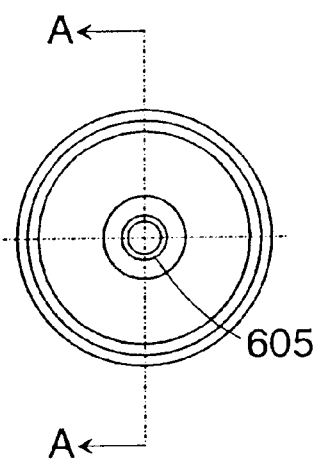
FIGS. 6A–B show a preferred lower isolation assembly in plan view and cross-section view.
Figure 6B:
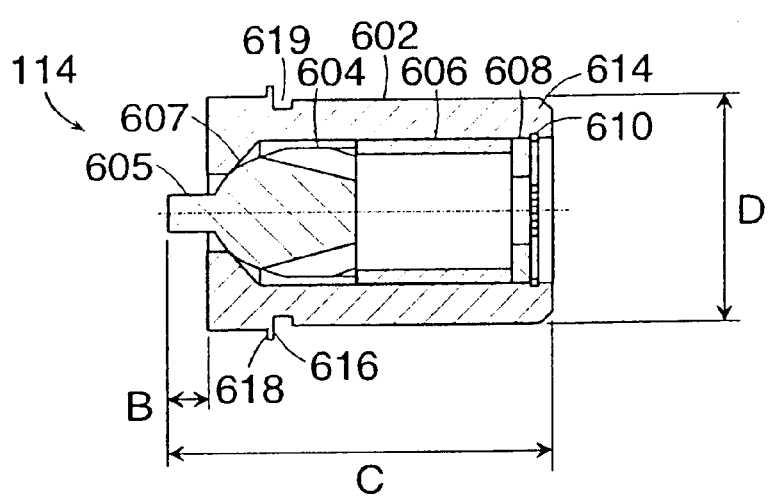

A preferred lower isolation assembly 114 is shown in FIGS. 6A–B. FIG. 6A is a plan view; and FIG. 6B is a cross-section view along A—A. The table below provides the sizes (measure in inches) of the illustrated dimensions.

| B | 0.07 | C | 0.695 | D | 0.395 |
|---|---|---|---|---|---|

Lower isolation assembly 114 defines a portion of the fluid isolation interface between housing 140 and cartridge 108. The lower isolation assembly 114 includes body 602, plunger valve 604, spring 606, washer 608, and retaining ring 610.

To make the assembly, plunger valve 604 is first inserted into the cavity 612 defined by body 602, followed by the spring 606, washer 608, and retaining ring 610, which is fit into groove 614 to keep the assembly 114 together. The assembly 114 is then inserted into cavity 510 until lower surface 616 of positive stop 618 contacts surface 516 of base 110. The two entities are then welded (e.g., low energy welding such as electron beam or laser welding) at this contact point. The stop 618 and recess 619 facilitate accurate alignment of the assembly 614 into cavity 612. This architecture allows the isolation assembly to be made separately from the rest of the CCS until the final insertion and welding steps.

The assembly 114 operates as follows. When spring 606 is in a substantially uncompressed state (e.g., as shown), a portion of the cavity surface contacts plunger valve 604 to form a line seal 607 to prevent fluid flow. This uncompressed state is achieved, for example, as the housing 140 and cartridge 108 are being uncoupled. When plunger valve extension 605 is urged sufficiently inward into body 602 the line seal will break, allowing fluid to pass. As will be explained below, the components are designed so that flow rates increase as the valve 604 is moved further from the line seal surface.

A preferred body 602 is shown in more detail in FIGS. 7A–C. FIG. 7A is a plan view; FIG. 7B is a cross-section view along A—A; and FIG. 7C shows a detail for holding retaining ring 610. The table below provides the sizes (measure in inches) of the illustrated dimensions.

| B | 0.395 | G | 0.14 | L | 0.03 | Q | 0.268 |
|---|---|---|---|---|---|---|---|
| C | 0.37 | H | 0.38 | M | 0.015 | R | 0.009 |
| D | 0.268 | I | 0.408 | N | 0.125 | S | R0.005 |
| E | 0.25 | J | 0.436 | O | 0.005 | T | 0.049 |
| F | 45° | K | 0.625 | P | 0.042 | U | 0.022 |

FIG. 7B more particularly shows body cavity 612 which receives plunger valve 605, and the cavity surface 702 including the portion that contacts plunger valve 604 to form the line seal 607. Body 602 further defines opening 704 through which plunger valve extension 605 protrudes when the spring 606 is in a relatively uncompressed state. Groove 614 is defined to receive a retaining ring such as Waldes no. N5000-25. The body 602 is electropolished to 10 Ra microinch finish. Aspect 710 is 0.02 inch by 45° chamfer.

A preferred plunger valve 604 is shown in more detail in FIGS. 8A–B. FIG. 8A is a bottom view; and FIG. 8B is a cross-section view along A—A. The table below provides the sizes (measure in inches) of the illustrated dimensions.

| B | 0.092 | F | 25° | J | 0.175 | N | R. 0.015 |
|---|---|---|---|---|---|---|---|
| C | 0.097 | G | 0.097 | K | 0.135 | O | 0.06 |
| D | 0.245 | H | 0.339 | L | 0.076 | P | 15° |
| E | Full R | I | 0.214 | M | SR0.094 | | |

Valve surface 802 contacts body surface 702 to form the line seal 607 when spring 606 is in a substantially uncompressed state. Valve 604 includes four tapered, contoured recesses 804 which together define a fluid communication path when the spring 606 is compressed sufficiently to break the line seal. The shape of the recesses 804 provides for a larger fluid communication path as the spring 606 is compressed further. Lower surface 806 rests on spring 606 when the isolation assembly 114 is assembled. All surfaces of valve 604 is electropolished to 10 Ra microinch finish.

One end of spring 606 rests on the valve's lower surface 806, and another end rests on washer 608, such as a no. 4, N series washer. A preferred lower isolation assembly spring 606 provides about 50–250 pounds of force.

Figure 9A:
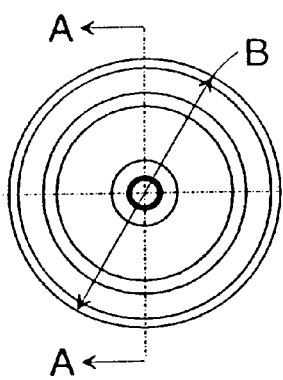
FIGS. 9A–B show a preferred second lower isolation assembly in plan view and in cross-section view.
Figure 9B:
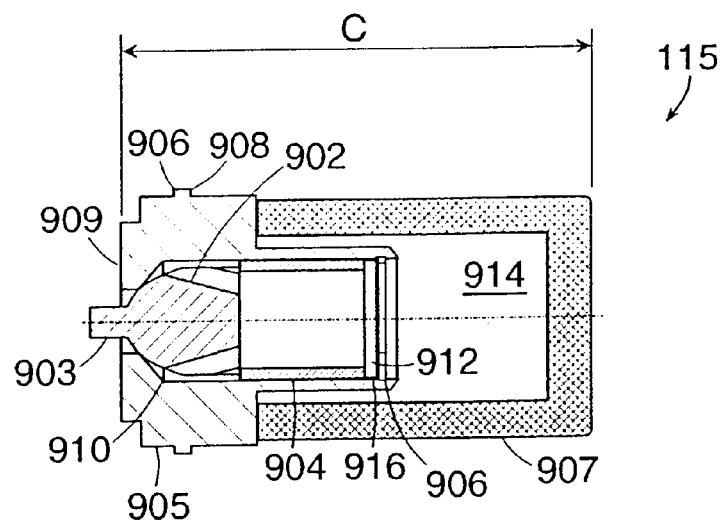

A second lower isolation assembly 115 is shown in FIGS. 9A–B. FIG. 9A is a plan view; and FIG. 9B is a cross-section view along A—A. The table below provides the sizes (measure in inches) of the illustrated dimensions.

| B | 0.585 | C | 1.064 |
|---|---|---|---|

The second lower isolation assembly 115 defines a portion of the fluid isolation interface between the housing 140 and cartridge 108. It includes support 905, plunger valve 902 (preferably identical to plunger valve 604, described above), spring 904 (preferably identical to spring 606, described above), washer 916, retaining ring 906 (e.g., Waldes no. N5000-25) and filter 907 (preferably a filter such as part no. 1204380-25-FLO available from Mott Corporation).

To make assembly, e.g., 112a, plunger valve 902 is first inserted into cavity 910 defined by support 905, followed by spring 904, washer 916, and retaining ring 906, which is fit into groove 912 to keep the combination together. The combination is then welded to filter 907 (e.g., tig) and the assembly 115 is inserted into cavity 512 until lower surface 908 of shoulder 910 contacts surface 516 of base 110. The assembly 115 and base 110 are then welded (e.g., low energy welded) at this contact point. This architecture allows the isolation assembly to be made separately from the rest of the CCS until the final insertion and welding steps.

The assembly 115 operates as follows. When spring 904 is in a substantially uncompressed state (e.g., as shown), a portion of the cavity surface contacts plunger valve 902 to form a line seal 909 to prevent fluid flow. This uncompressed state is achieved, for example, as the housing 140 and cartridge 108 are being uncoupled.

When plunger valve extension 903 is urged inward into body support 905 sufficiently the line seal will break, allowing fluid to pass. As will be explained below, components are designed so that flow rates increase as the valve 902 is moved further from the line seal surface.

Figure 10B:
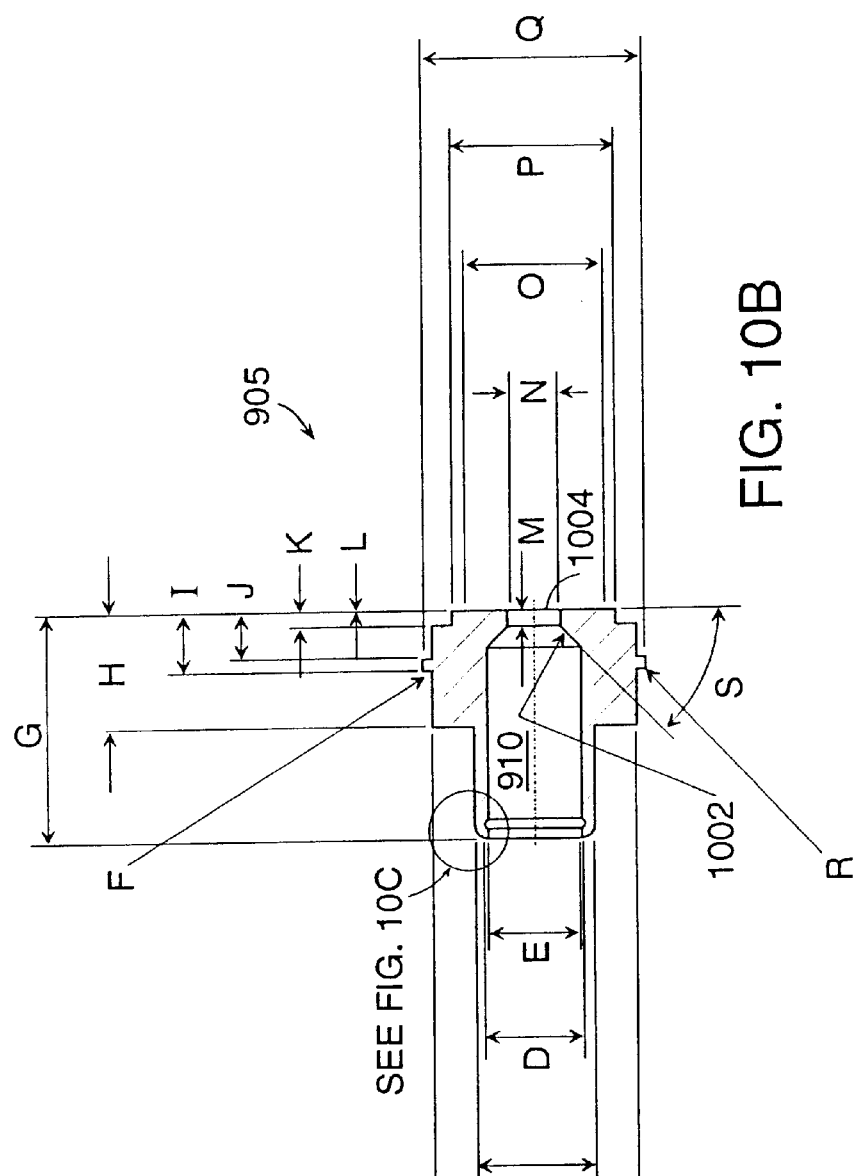
FIGS. 10A–C show a preferred support in bottom view, cross-section view, and enlarged view.
Figure 10C:
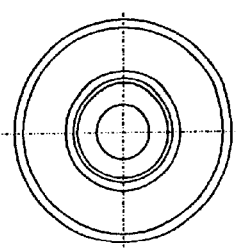
Figure 10A:
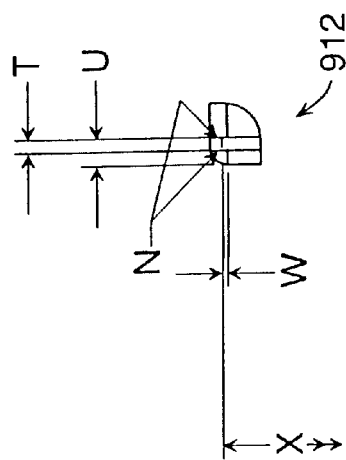

A preferred support 905 is shown in more detail in FIGS. 10A–C. FIG. 10A is a bottom view; FIG. 10B is a cross-section view along A—A; and FIG. 10C shows groove 912 for holding retaining ring 906. The table below provides the sizes (measure in inches) of the illustrated dimensions.

| B | 0.545 | H | 0.314 | N | 0.14 | T | 0.022 |
|---|---|---|---|---|---|---|---|
| C | 0.312 | I | 0.156 | O | 0.38 | U | 0.049 |
| D | 0.268 | J | 0.125 | P | 0.437 | V | R0.005 |
| E | 0.25 | K | 0.04 | Q | 0.585 | W | 0.009 |
| F | R0.005 | L | 0.005 | R | 0.01 | X | 0.268 |
| G | 0.625 | M | 0.042 | S | 45° | | |

FIG. 10B more particularly shows support cavity 910 which receives plunger valve 902 including the portion that contacts plunger valve 902 to form the line seal 909. Support 905 further defines opening 1004 through which plunger valve extension 903 protrudes when the spring 904 is in a relatively uncompressed state. Groove 912 is defined to receive a retaining ring such as Waldes no. N5000-25. The support 905 is electropolished to 10 Ra microinch finish. Opening 1006, opposite opening 1004, allows access to cavity 910 so the isolation assembly 115 may be constructed and so that fluid may pass to filter cavity 914, when plunger valve 902 breaks the line seal formed with surface 1002.

b. Removable Cartridge

Figure 11:
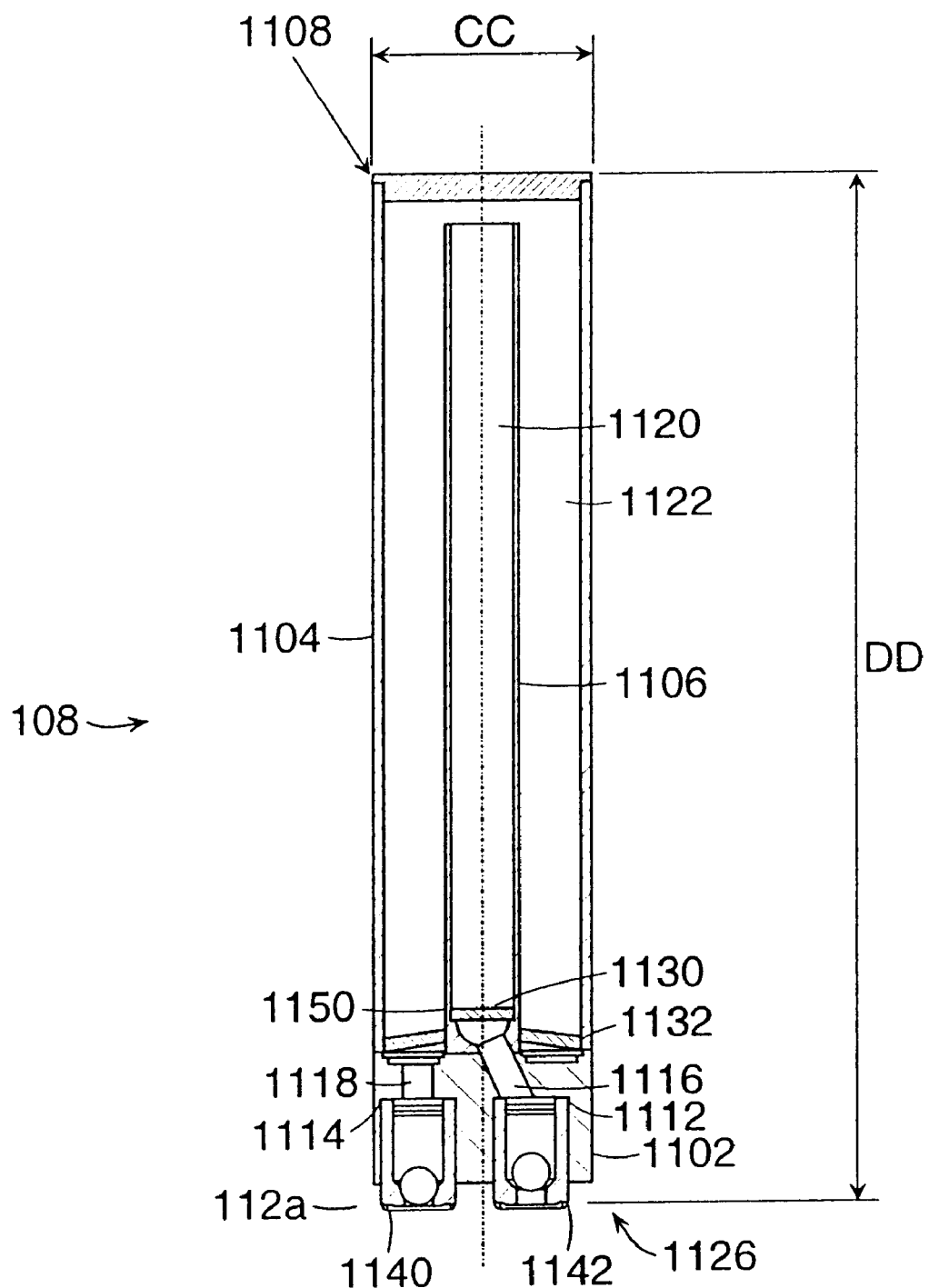
FIG. 11 shows a preferred cartridge assembly in cross-section view.

A preferred cartridge assembly 108 is shown in FIG. 11, a cross-section view along B—B of FIG. 1B. Cartridge 108 is designed to hold purification media (e.g., resins such as molecular sieve, reactive catalysts, or other types of resins and media) and provides a portion of the fluid isolation interface between the housing 140 and cartridge 108. It includes an assembled combination of upper isolation assemblies 112a, 112b, base 1102, outer tube 1104, inner tube 1106, and end cap 1108. Unless otherwise noted, steel (e.g., 316L) is used to manufacture the above components and sub-components, and all components and sub-components are polished to a 32 Ra microinch finish, for example, via mechanical polishing. The table below provides sizes (measure in inches) of the illustrated dimensions.

| CC | 1.125 | DD | 5.122 |
|---|---|---|---|

Figure 12A:
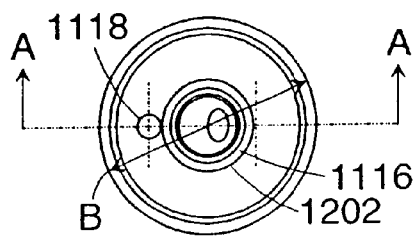
FIGS. 12A–C show a preferred cartridge base in plan view, cross-section view, and bottom view.
Figure 12B:
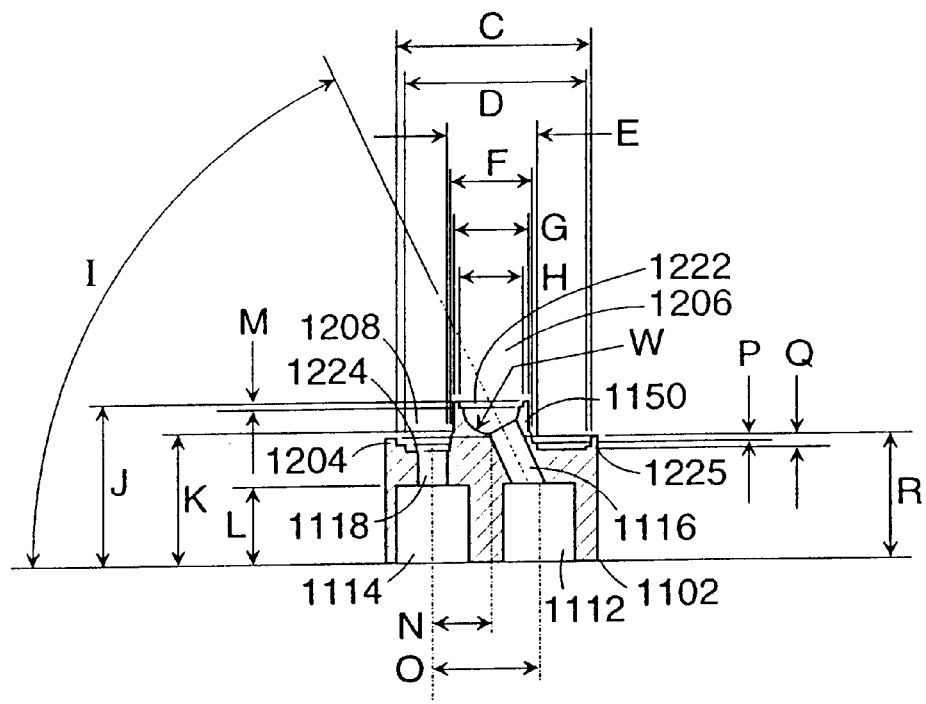
Figure 12C:
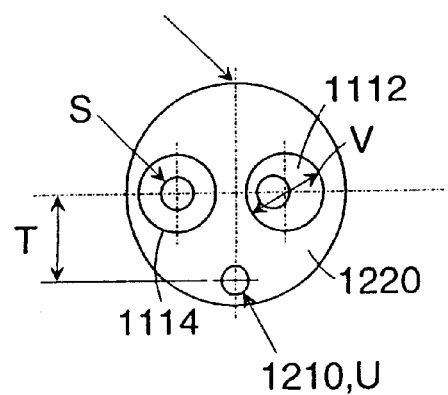

A preferred cartridge base 1102 is shown in FIGS. 12A–C. FIG. 12A is a plan view; FIG. 12B is a cross-section view along A—A; and FIG. 12C is a bottom view. The table below provides the sizes (measure in inches) of the illustrated dimensions.

| B | 1.125 | H | 0.319 | N | 0.316 | T | 0.438 |
|---|---|---|---|---|---|---|---|
| C | 1.027 | I | 64.3° | O | 0.566 | U | 0.136 |
| D | 0.972 | J | 0.824 | P | 0.031 | V | 0.395 |
| E | 0.45 | K | 0.676 | Q | 0.062 | W | 0.140 |
| F | 0.395 | L | 0.410 | R | 0.647 |   | Full R |
| G | 0.375 | M | 0.025 | S | 0.157 |   |   |

Base 1102 defines cavities 1112 and 1114 into which upper isolation assemblies 112a, 112b are inserted and welded. It also defines conduits 1116 and 1118, also shown in FIG. 11, which provide a fluid path from the cavities to cartridge ports 1222, 1224. Fort 1222 includes an inner circular recess 1206 for holding frit 1130. Port 1224 includes an outer annular recess 1208 for holding frit 1132 and a recess 1225, defining a plenum under frit 1132. The plenum provides better distribution of the fluid to and through frit 1132. Frit 1132 is made of stainless steel (e.g., 316L) to have a porosity of 20 microns, and has an outer diameter of about 1.035 inches, an inner diameter of about 0.39 inches, and a thickness of about 0.06 inches. It has a slightly bowed shaped but is pressed flat during assembly. The frit 1130 is made from similar material and has similar porosity and thickness but has a diameter of about 0.321 inches. Base 1102 further defines an inner shoulder 1202 on which inner tube 1106 is placed and welded to define an inner cylindrical region 1120 (see FIG. 11), and an outer region 1204 on which outer tube 1104 is placed and welded to define an outer annular region 1122 (see FIG. 11). The surfaces of details D, E, S, V, and W are electropolished to a 10 Ra microinch finish. When so assembled, inner cylindrical region 1120 is in fluid communication with port 1222, conduit 1116, and cavity 1112 (and thus upper isolation assembly 112b), and outer annular region 1122 is in fluid communication with port 1224, conduit 1118, and cavity 1114 (and thus upper isolation assembly 112a). Base 1102 further defines hole 1210 within surface 1220 for receiving locating pin 126 (see FIG. 1D). The assembled cartridge has a large aspect ratio in that the fluid flow path is much longer than its diameter. In the illustrated cartridge the path is about twice as long as the vertical height of the cartridge.

Figure 13A:
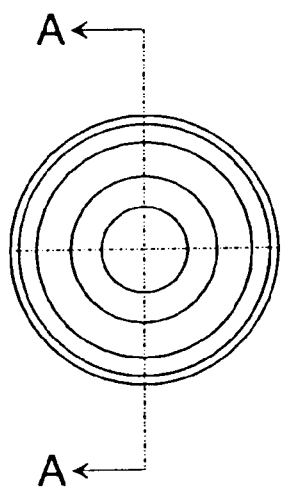
FIGS. 13A–B show a preferred upper isolation assembly in plan view and cross-section view.
Figure 13B:
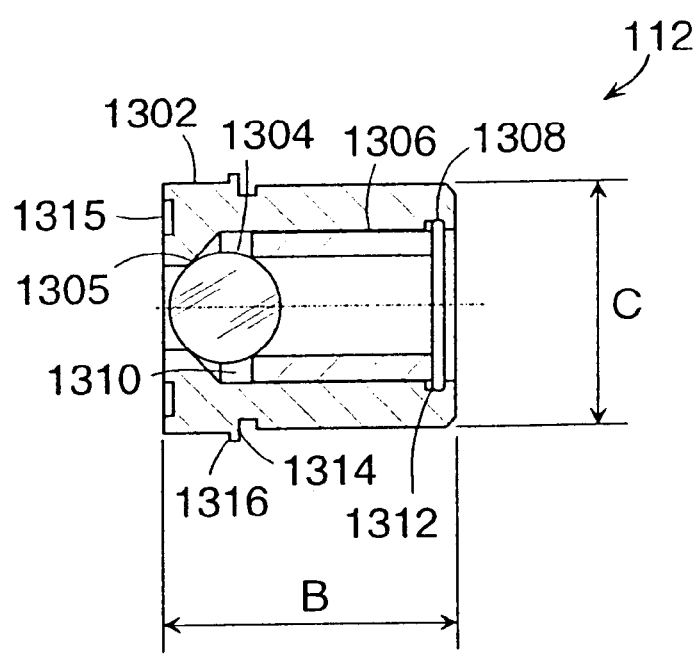
Figure 18G:
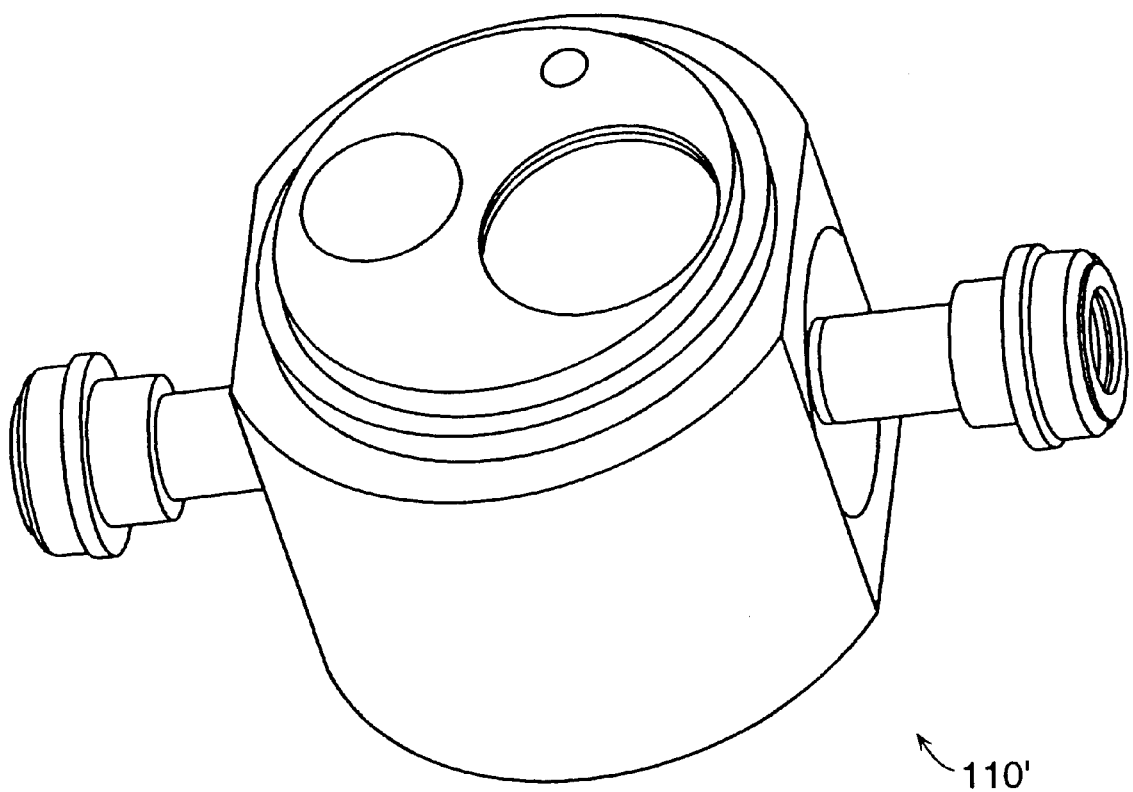

A preferred upper isolation assembly, e.g., 112a, is shown in FIGS. 13A–B. Assembly 112a is preferably used both for assembly 112a and 112b, described above. FIG. 13A is a plan view; and FIG. 13B is a cross-section view along A—A. The table below provides the sizes (measure in inches) of the illustrated dimensions.

| B | 0.5 | C | 0.395 |
|---|---|---|---|

The upper isolation assembly 112a defines a portion of the fluid isolation interface between housing 140 and cartridge 108. It includes body 1302, ball valve 1304, spring 1306, and a retaining ring 1308 (e.g., Waldes no. N5000-25).

To make the assembly, ball valve 1304 is first inserted into cavity 1310 defined by body 1302, followed by spring 1306 (preferably identical to the springs used in lower isolation assemblies 114, 115), and retaining ring 1308, which is fit into groove 1312 to keep the assembly 112a together. The assembly 112a is then inserted into a corresponding cavity 1114, 1112 until lower surface 1314 of positive stop 1316 contacts surface 1220 of base 1102. In each case, the base and assembly are welded (e.g., low energy welded) at this contact point. This architecture allows the isolation assembly to be made separately from the rest of the CCS until the final insertion and welding steps.

The assembly 112a operates as follows. When spring 1306 is in a substantially uncompressed state (e.g., as shown), a portion of the cavity surface contacts ball valve 1304 to form a line seal 1305 to prevent fluid flow. This uncompressed state is achieved, for example, as the housing 140 and cartridge 108 are being uncoupled. When the ball valve 1304 is urged inward into body 1302 sufficiently the line seal will break, allowing fluid to pass.

A preferred upper isolation assembly body 1302 is shown in more detail in FIGS. 14A–E. FIG. 14A is a plan view; FIG. 14B is a cross-section view along A—A; FIG. 14C is a bottom view; FIG. 14D shows a detail for holding an o-ring (e.g., 1140 or 1142 in FIG. 11; FIG. 14E shows a detail for holding a retaining ring. The table below provides the sizes (measure in inches) of the illustrated dimensions.

| B | 0.395 | I | 0.03 | P | 0.24 | W | 0.02 | ×45° |
|---|---|---|---|---|---|---|---|---|
| C | 0.37 | J | 0.14 | Q | 0.015 | X | 0.268 |   |
| D | 0.268 | K | 0.408 | R | 16 Ra | Y | 0.009 |   |
| E | 0.25 | L | 0.436 | S | 0.24 | Z | R0.005 |   |
| F | 0.125 | M | 45° | T | 0.355 |   |   |   |
| G | 0.039 | N | 0.5 | U | 0.025 |   |   |   |
| H | 0.015 | O | 0.355 | V | 0.022 |   |   |   |

FIG. 14B more particularly shows body cavity 1310 which receives ball valve 1304, and the cavity surface 1405 including the portion that contacts ball valve 1304 to form the line seal 1305. Body 1302 further defines opening 1404 through which ball valve 1304 may be urged to compress spring 1306. Groove 1312 is defined to receive a retaining ring. Groove 1315 is defined to receive an o-ring 1140, 1142 (see FIG. 11). A preferred embodiment uses a metal o-ring such as part no. 4QO-SS available from Parker Instrumentation. The size of groove 1315 is such to make the o-ring effectively self-retaining after the o-ring is inserted with slight pressure. The o-ring forms a seal between an upper and lower isolation assembly, e.g., 112a and 114, when the housing 140 and cartridge 108 are being coupled. The body 602 is electropolished to 10 Ra microinch finish. Groove 1315 is finished 16 RA circular lay.

A preferred ball valve 1304 is ³⁄₁₆" stainless steel grade 50–100.

A preferred end cap 1108 is shown in more detail in FIGS. 15A–B. FIG. 15A is a plan view; and FIG. 15B is a cross-section view along A—A. The table below provides the sizes (measure in inches) of the illustrated dimensions.

| B | 1.125 | D | 0.139 | F | 0.015 |
|---|---|---|---|---|---|
| C | 1.010 | E | 0.049 | G | 0.015 |

When the base 1102 and tubes 1104, 1106 are assembled as described above, the inner circular region 1120 and outer annular region 1122 are exposed at the end, opposite base 1102. This opening facilitates filling the regions completely with a media of choice, depending on the application. Frits 1130 and 1132 prevent the media from entering corresponding conduits 1116, 1118. The design avoids crevices and other details that are difficult to fill, reducing the likelihood of media voids. Once the regions are filled (e.g., in a clean room environment) cap 1108 is inserted into and welded to tube 1104 to seal the media in the cartridge at one end, the tower isolation assemblies sealing the cartridge at the other end.

A preferred outer tube 1104 is shown in FIGS. 16A–B. FIG. 16A is an end view, and FIG. 16B is a cross-section view along A—A. The table below provides the sizes (measure in inches) of the illustrated dimensions.

| B | 1.125 | C | 4.316 | D | .049 |
|---|---|---|---|---|---|

Outer tube 106 may be made from any suitable form of standard tubing (e.g., 316L). As stated above, outer tube 1104 is butt welded (e.g., tig) at one end to base 1102.

A preferred inner tube 1106 is shown in FIGS. 17A–B. FIG. 17A is an end view, and FIG. 17B is a cross-section view along A—A. The table below provides the sizes (measure in inches) of the illustrated dimensions.

| B | 0.375 | C | 3.932 | D | 0.028 |
|---|---|---|---|---|---|

Inner tube 106 may be made from any suitable form of standard tubing (e.g., 316L). Inner tube 1106 is butt welded (e.g., tig) at one end to base 1102.

c. Fluid Flow Interface Operation

Initially an uncoupled housing 140 and cartridge 108 are isolated at their respective isolation assemblies 114, 115, 112a, 112b, because the natural state of the assembly springs is uncompressed urging respective valves to form line seals, as described above. As the cartridge 108 is installed into alignment with the housing 140 to couple the two entities, the plunger valve extensions 605, 903 of lower isolation assemblies 114, 115 pass through openings 1404 of upper isolation assemblies 112a, 112b and come into contact with ball valve 1304. Further tightening causes the upper springs 1306 and lower springs 606, 904 to compress. This causes the line seals 1307 of the upper isolation assemblies and line seals 607, 909 of the lower assemblies to break. Once opened to about 0.025 inches the flow paths provide 0–20 slpm flow rate.

d. Fluid Flow Paths

One form of fluid communication path defines port 142 as an input and port 144 as an output. (See FIG. 1C.) Under this arrangement, when the cartridge 108 and housing 140 are properly coupled, as described above, fluid flows as follows: fluid enters port 142 and flows through lower isolation assembly 114, upper isolation assembly 112a, conduit 118, media in exterior annular region 1122, interior cylindrical region 1120, conduit 1116, upper isolation assembly 112b, lower isolation assembly 115, and out port 144. A second form may be defined by reassigning input and output, in which case the fluid flow would be opposite to the one described above.

In either case, the concentric arrangement fully utilizes the interior region of cartridge 108 to hold media, thus using the space efficiently. The completely filled cartridge lacks media voids further improving performance. Moreover, the completely filled nature makes the arrangement insensitive to the attitude of the cartridge during handling.

II. Other Embodiments

The above embodiment is particularly relevant for contamination control in the context of semiconductor manufacturing using gas-stick arrangements. It is susceptible to many changes and modifications without departing from the scope of the invention. Many of the dimensions involved are a consequence of developing de fiacto standards in the industry. Thus, for example, the footprint of the above embodiment are a consequence of this commercially-dictated current standard.

One particularly advantageous aspect of the invention is that the housing or the cartridge may be constructed from multiple pieces including sheet tubing. This offers significant cost advantages compared to designs that require machined rod stock or the like. However other structures, including single-piece and multi-piece arrangements could be substituted. Moreover, materials other than 316L steel may be employed, e.g., Nickel. Likewise, there are many components and subcomponents that are known substitutes. Some examples include (1) the use of z-seals or other seals for o-rings; (2) the inclusion or exclusion of washers in conjunction with retaining rings to operate with springs in the isolation assemblies, (3) the uses of various materials for the ball valves or plungers, such as nickel sapphire, or ruby, (4) the inclusion of cooperating inserts for other isolation arrangements, e.g., sapphire insert to work with sapphire ball valve.

The footprint of base 110 as well as the port definition 140, 142 is primarily driven by the need to port to known gas-stick arrangements. Different dimensions and footprints may be easily substituted for other systems. The vertical dimension of the system may likewise be modified with a reasonable degree of flexibility to attain different capacities.

Cap 102 provides leak test port 122, but this port may be placed in other locations without loss of functionality. Cap 102 is believed to have an advantage concerning ease of access to port 122, but other locations may be suitable. Likewise there are many known arrangements other than ⅛" VCR that could be used for leak test port 122.

The embodiment described above is particularly relevant to a purification context, as the inner-outer flow of cartridge 108 has been found advantageous in this context by maximizing the amount of flow path through the media for a given unit of volume. Other contexts, such as filtration, may employ alternative inner cartridge designs. For example, the same housing and nearly the same cartridge may be used in a filtration context. In a filtration context the cartridge could be used to contain a one-piece filter. Such an arrangement would be easy to use and have improved "dry down" times of the filter as the filter would be isolated from atmosphere.

The housing base 110, like the other subcomponents, is susceptible to many design changes. FIGS. 18A–G show an alternative base 110' in side elevation view, cross-section view along A—A, plan view, cross-section view along B—B, enlarged view, and in perspective view. The alternative base 110' has application ports 1802 and 1804 extending from the sides of the base, rather than on the bottom, and allows the CCS to be used in different applications, having different fluid plumbing and fixtures. Internal wetted surfaces are 10 Ra electropolished. The table below provides the sizes (measure in inches) of the illustrated dimensions.

| | |
|---|---|
| C | 1.125 |
| D | 1.189 |
| E | 0.09 |
| F | 0.09 |
| G | 1.065 |
| H | 0.875 |
| I | 0.015 × 45° |
| J | R 0.125 |
| K | 15° |
| L | 0.563 |
| M | 0.586 |
| N | 0.438 |
| O | 1.5 |
| P | 0.1202 |
| Q | 0.316 |
| R | 0.566 |
| S | 0.397 |
| T | 100° |
| U | 0.45 |
| V | 0.1 |
| W | 0.5 |
| X | 60° |
| Y | 45° |
| Z | 0.675 |
| AA | 1.35 |
| BB | 0.5 |
| CC | 1 |
| DD | #10-32 UNF-2B |
| EE | 0.25 |
| FF | 0.22 |
| GG | 0.19 |
| HH | 0.004 |
| II | R 0.005 |
| JJ | 0.025 |
| KK | 1.25 |

Figure 19:
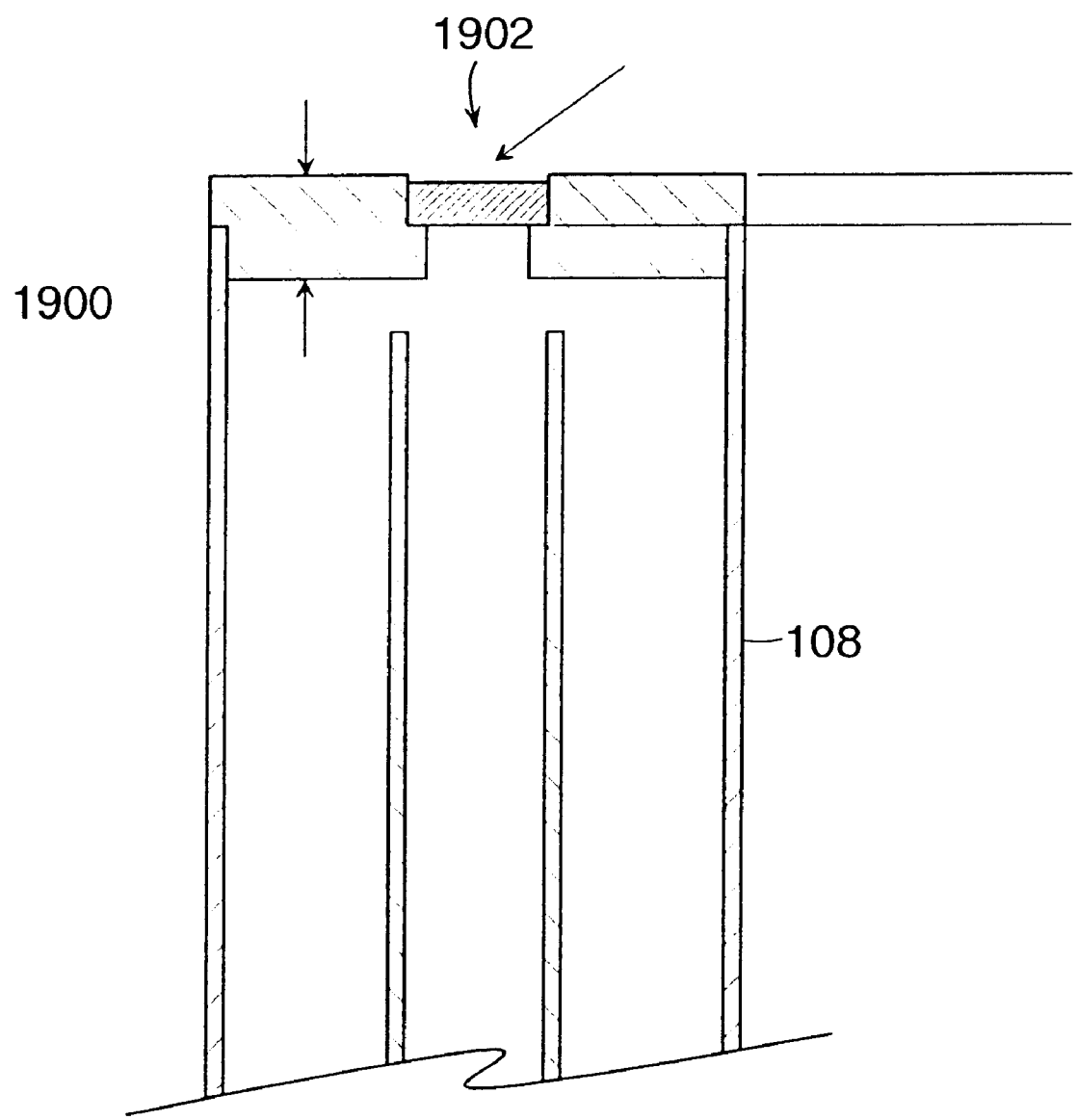
FIG. 19 shows an alternative cartridge cap.

FIG. 19 shows an alternative cap 1900 having an opening into which fill plug 1902 may be secured. The cap 1900 may be fit onto cartridge 108, including welding, before the interior of the cartridge 108 is filled with the desired media. The media may then be placed in the interior through the opening and the plug may then close the opening. For example, the plug may be press fit causing mechanical deformation of the plug 360° around with flaring near the vertical center. It may even be welded. This embodiment offers an advantage in that the cap 1900 may be assembled with the cartridge 108 before filling. Thus, the media will not be subjected to any heat from welding the cap. It also allows the assembly to be easily sealed after the media is inserted facilitating cartridge assembly. The cap 1900 is about 5/16" thick, extending past tube 108 about 0.135 inches. Plug 1902 may be about 0.25 inch diameter and about 0.125 inches thick.

Figure 20:
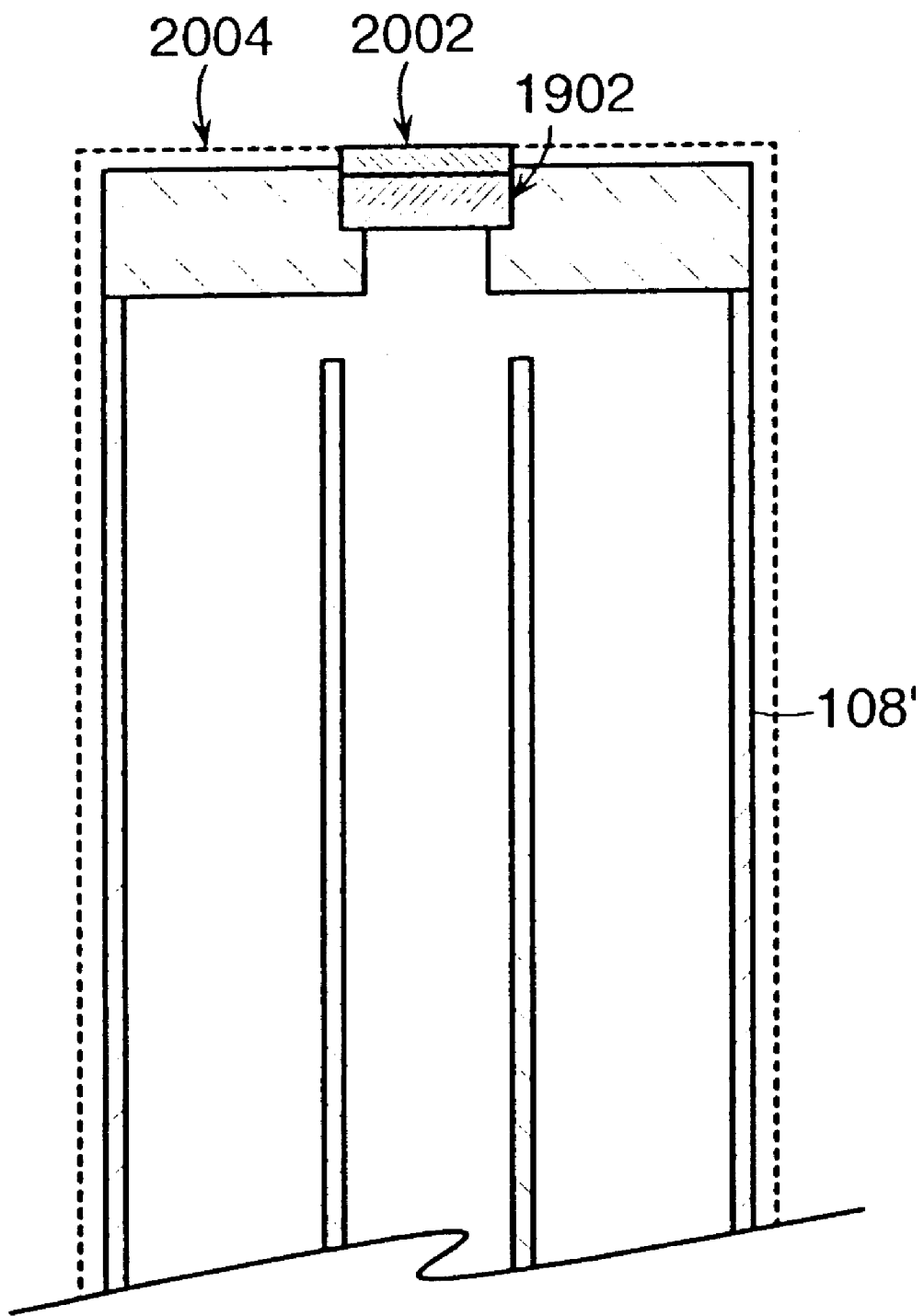
FIG. 20 shows a variation to an alternative cartridge cap.

FIG. 20 shows a variation to the above that incorporates a shim 2002. The shim ensures that a cap, e.g., 102 may be placed over the cartridge and provide sufficient downward force, even if the dimension 2004 of the cartridge 108' is slightly different than specification because of, for example, manufacturing tolerances. Likewise, dimension 2004 may be slightly off because of the position of plug 1902 after insertion.

Figure 21:
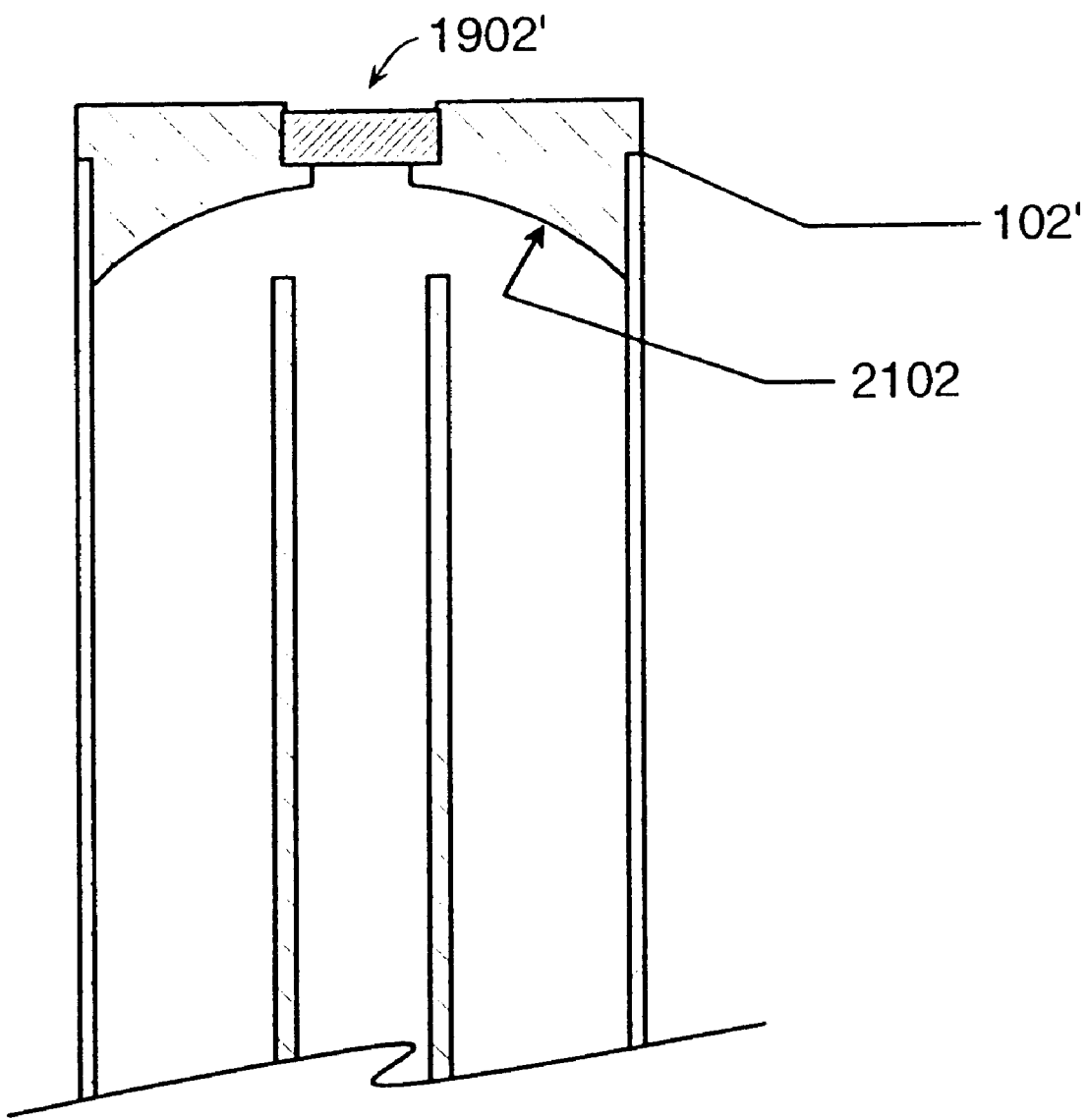
FIG. 21 shows another variation to an alternative cartridge cap.

FIG. 21 shows another variation in which cap 102' includes a contour 2102 on its inner surface. The contour is designed to correspond to the desired media and to its "fill patterns." The fill patterns are determined by observing the shape that the media attains by pouring media through the opening filled by plug 1902. The contour is designed so that the media better fills any openings or crevices to fill media voids.

Figure 22:
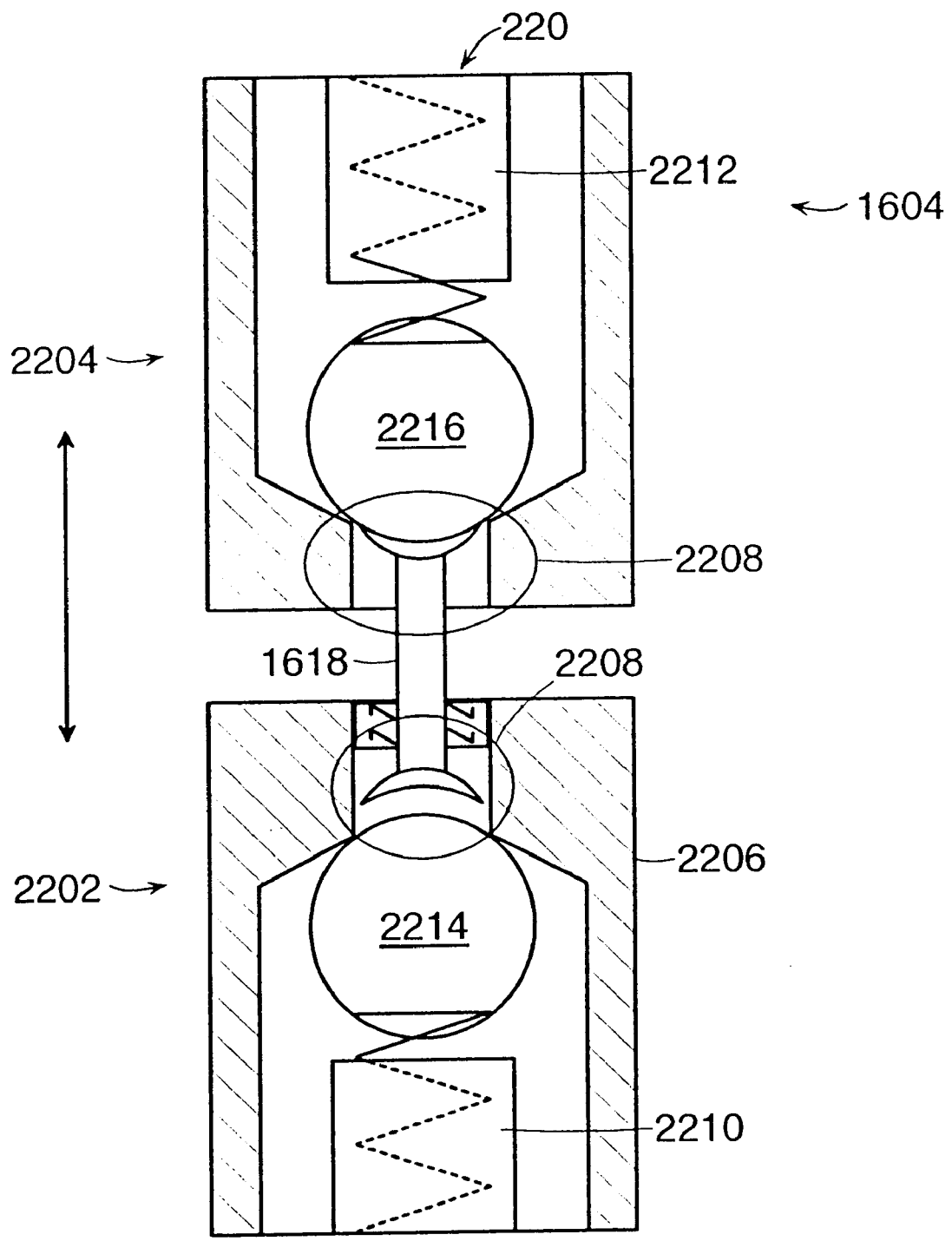
FIG. 22 shows a cross-section view of a dual ball valve arrangement as an alternative fluid interface.

The fluid interface may be substituted with alternative arrangements. FIG. 22 shows a cross-section view of a dual ball valve arrangement. Lower isolation assembly 220 and upper isolation assembly 2204 operate analogously to that described above. Each includes a body 2206, 2208, a spring 2210, 2212, a ball valve 2214, 2216 and retaining rings (not shown) but positioned at the spring ends, e.g., 2220. The body shape would correspond to the respective cavity into which it would be inserted and welded. The other components would be essentially identical except that the springs could be different as described above.

Likewise, the isolation mechanisms may be modified to operate sequentially by varying the springs' characteristics. For example, the cartridge may be designed to close before the lower isolation assembly closes.

Figure 23:
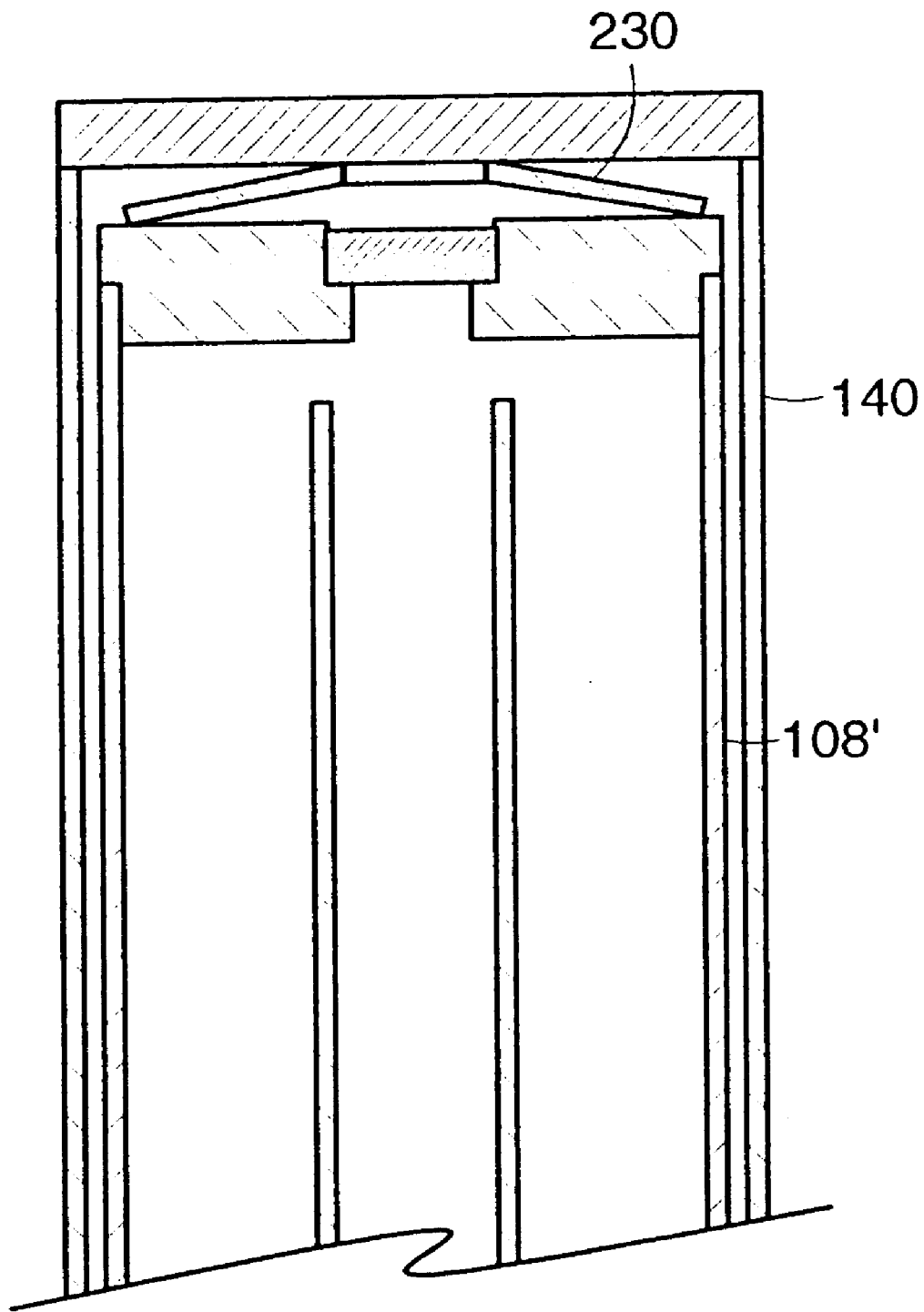
FIG. 23 shows an alternative embodiment in which a spring washer biases a cartridge.

The housing 140 may be made to work with different size cartridges. For example, FIG. 23 shows an embodiment in which a spring washer 2300 is used to bias the cartridge 108' downward, effectively to force engagement of the isolation mechanisms. This may be used for cartridges that are shorter in vertical length (and possibly smaller diameter) than the maximum length cartridge for which the housing is designed. The washer 2300 may also be used for the maximum length cartridge to ensure engagement of the isolation mechanisms. This may be helpful, for example, to compensate for manufacturing tolerances.

FIGS. 24A–C show an alternative biasing mechanism that may be substituted for the helical springs described above. A wire column 2402 may be arranged longitudinally to engage the flat surface of plunger valve 604 and to a support washer 2404. The support washer may be stamped from steel for example to form a hub 2406 and spoke 2408 design, in which the hub contacts the other end of wire 1802. The hub may be positioned off center to facilitate the bending of the wire 2402, as shown in FIG. 24C.

Cap 102 is completely removable to facilitate access to cartridge 108, but other arrangements may be used. For example, the cap may be made removable in the sense of providing a cavity opening yet remain attached to the housing 140 through hinges and other known mechanisms.

Moreover, other fluid applications in other industries having different operation parameters, such as the amount of fluid that needs to be processed and the rate of flow, may benefit from the invention. It is well within the ordinary skill of the relevant art to modify the dimensions and components to address these other parameters.

The cartridge may be modified to define even more regions, rather than the dual concentric embodiment, to further lengthen the flow path and improve a flow path's aspect ratio. This could be done for example by including more tubes in alternating arrangement to define the flow path.

Having described an exemplary embodiment, it should be apparent to persons of ordinary skill in the art that changes may be made to the embodiment described without departing from the spirit and scope of the invention.

What is claimed is:

1. A contamination control system, comprising:

a housing having a cartridge input-output port and an application input-output port;

a cartridge of a size to completely fit in an interior of the housing, the cartridge being coupleable to the cartridge input-output port and engageable therewith to define a fluid communication path when the cartridge is engaged with the housing, wherein the fluid communication path flows from the application input port to the cartridge input port, through the cartridge to the cartridge output port, and from the cartridge output port to the application output port, wherein the cartridge defines a first containment boundary for fluid flowing through the cartridge, and the housing defines a second containment boundary for fluid flowing through the cartridge.

2. The system of claim 1 wherein the housing includes a repositionable cap for providing access to the housing interior in a first position, and for sealing the cartridge in the housing in a second position.

3. The system of claim 2 wherein the cap is removable.

4. The system of claim 1 wherein the housing provides a hermetic seal of the interior when the cap is in the second position.

5. The system of claim 1 wherein the cartridge input-output port of the housing includes a first input isolation mechanism and first output isolation mechanism, both the first input isolation mechanism and first output isolation mechanism having a first state defining a respective fluid communication path and a second state closing the respective fluid communication path, and wherein the cartridge includes a second input isolation mechanism and second output isolation mechanism, both the second input isolation mechanism and second output isolation mechanism having a first state defining a respective fluid communication path and a second state closing the respective fluid communication path.

6. The system of claim 5 wherein the first input isolation mechanism and first output isolation mechanism are resiliently engageable to cause the first input isolation mechanism and first output isolation mechanism to change from the first state to the second state.

7. The system of claim 5 wherein the second input isolation mechanism and second output isolation mechanism are resiliently engageable to cause the second input isolation mechanism and second output isolation mechanism to change from the first state to the second state.

8. The system of claim 6 wherein the first input isolation mechanism and first output isolation mechanism each include a helical spring to resiliently bias the isolation mechanisms from the first state to the second state.

9. The system of claim 6 wherein the first input isolation mechanism and first output isolation mechanism each include a wire column to resiliently bias the isolation mechanisms from the first state to the second state.

10. A contamination control system, comprising:

a housing having a cartridge input-output port and an application input-output port;

a cartridge of a size to completely fit in an interior of the housing, the cartridge being coupleable to the cartridge input-output port and engageable therewith to define a fluid communication path therebetween when engaged; and a leak test port to test an interior of the housing.

11. A contamination control system, comprising:

a housing having a cartridge input-output port and an application input-output port; wherein the housing includes a repositionable cap for providing access to the housing interior in a first position, and for sealing the cartridge in the housing in a second position; and wherein the cap includes a leak test port to test an interior of the housing; and a cartridge of a size to completely fit in an interior of the housing, the cartridge being coupleable to the cartridge input-output port and engageable therewith to define a fluid communication path therebetween when engaged.

12. The system of claim 1 wherein the housing has a size to fit in a three dimensional space of approximately 1.48 inched by 1.478 inches by 6.95 inches.

13. The system of claim 1 further including a biasing mechanism placed between the housing and the cartridge to urge the cartridge to engage with the housing.

14. A housing for a containment control system, comprising:

a body defining a housing interior and having cartridge input-output port and an application input-output port; wherein the cartridge input-output port includes a first input isolation mechanism and first output isolation mechanism, both the first input isolation mechanism and first output isolation mechanism having a first state defining a respective fluid communication path and a second state closing the respective fluid communication path, the first state being activatable by engagement with a cartridge and the second state being activatable by disengagement with a cartridge; and a repositionable cap for providing access to the housing interior in a first position, and for sealing the cartridge in the housing in a second position.

15. The housing of claim 14 wherein the cap is removable.

16. The housing of claim 14 wherein the housing provides a hermetic seal of the interior when the cap is in the second state.

17. The housing of claim 14 wherein the first input isolation mechanism and first output isolation mechanism are resiliently engageable to cause the first input isolation mechanism and first output isolation mechanism to change from the first state to the second state.

18. A housing for a containment control system, comprising:

a body defining a housing interior and having cartridge input-output port and an application input-output port;

a repositionable cap for providing access to the housing interior in a first position, and for sealing the cartridge in the housing in a second position; and a leak test port to test an interior of the housing.

19. A housing for a containment control system, comprising:

a body defining a housing interior and having cartridge input-output port and an application input-output port; and a repositionable cap for providing access to the housing interior in a first position, and for sealing the cartridge in the housing in a second position; wherein the cap includes a leak test port to test an interior of the housing.

20. The housing of claim 14 wherein the housing has a size to fit in a three dimensional space of approximately 1.48 inched by 1.478 inches by 6.95 inches.

21. The housing of claim 14 wherein the housing includes a base defining a first input cavity sized to receive the first input isolation mechanism and first output cavity sized to receive the first output isolation mechanism, and wherein the first input isolation mechanism and first output isolation mechanism are sized to be insertable into, respectively, the first input cavity and the first output cavity and wherein the first input isolation mechanism is inserted into the first input cavity and welded thereat and wherein the first output isolation mechanism is inserted into the first output cavity and welded thereat.

22. The housing of claim 14 wherein the first input isolation mechanism includes a plunger valve and a spring, wherein the plunger valve and spring are arranged so that the plunger valve is spring biased.

23. The housing of claim 21 wherein the first input isolation mechanism includes a body, a plunger valve and a spring, wherein the plunger valve and spring are contained in the body to spring bias the plunger valve and wherein the body is sized to be insertable into the first input cavity.

24. The housing of claim 14 wherein the first output isolation mechanism includes a support body, a plunger valve, a spring, and a filter welded to the support body wherein the plunger valve and spring are contained in an interior defined by the body and the filter to spring bias the plunger valve.

25. The housing of claim 14 wherein the body includes a base portion having the cartridge input-output port and the application input-output port and a length of sheet tubing connected to the base, and wherein the repositionable cap is placed over one end of the tubing.

26. A cartridge for a containment control system comprising:
 a body physically defining a multi-region interior chamber by walls extending longitudinally within the chamber, the chamber being filled with media and being in fluid communication with an input and an output and defining a media path through which fluid may be caused to flow, the media path being longer than the longitudinal dimension of the body.

27. The cartridge of claim 26 including a fill cap, which when in a first position, allows the interior to be completely filled with media and, which when in a second position, seals the cartridge.

28. The cartridge of claim 26 including a cap having a fill plug, which when in a first position, allows the interior to be completely filled with media and, which when in a second position, seals the cartridge.

29. The cartridge of claim 26 including an input isolation mechanism and an output isolation mechanism, both having a first state defining a respective fluid communication path and a second state closing the respective fluid communication path.

30. The cartridge of claim 29 wherein the input isolation mechanism and the output isolation mechanism are resiliently engageable to cause the input isolation mechanism and the output isolation mechanism to change from the first state to the second state.

31. The cartridge of claim 26 wherein the cartridge includes a base defining an input cavity sized to receive the input isolation mechanism and an output cavity sized to receive the output isolation mechanism, and wherein the input isolation mechanism and the output isolation mechanism are sized to be insertable into, respectively, the input cavity and the output cavity and wherein the input isolation mechanism is inserted into the input cavity and welded thereat and wherein the output isolation mechanism is inserted into the output cavity and welded thereat.

32. The cartridge of claim 29 wherein the input isolation mechanism includes a ball valve and a spring, wherein the ball valve and spring are arranged so that the ball valve is spring biased.

33. The cartridge of claim 31 wherein the input isolation mechanism includes a body, a ball valve and a spring, wherein the ball valve and spring are contained in the body to spring bias the ball valve and wherein the body is sized to be insertable into the input cavity.

34. The cartridge of claim 26 wherein the body includes an arrangement of concentric tubes defining the interior chamber to have an inner circular region and a concentric annular region.

35. A containment control system, comprising:
 a housing having an application input-output port, a removable cap for providing access to an interior of the housing when the cap is removed therefrom, a first fluid input isolation mechanism and a first fluid output isolation mechanism, both the first input isolation mechanism and the first output isolation mechanism having a first state defining a respective fluid communication path and a second state closing the respective fluid communication path, and
 a cartridge hermetically sealed in the interior of the housing and having a second fluid input isolation mechanism and second fluid output isolation mechanism, both the second input isolation mechanism and second output isolation mechanism having a first state defining a respective fluid communication path and a second state closing the respective fluid communication path, wherein each isolation mechanism is resiliently engageable to cause the isolation mechanism to change from the first state to the second state, such that the isolation mechanisms are in the first state when the cartridge is sealed in the housing and in the second state when the cartridge is removed therefrom.

* * * * *